(12) United States Patent
Fang et al.

(10) Patent No.: US 8,977,303 B2
(45) Date of Patent: *Mar. 10, 2015

(54) INTERWORKING CIRCUIT SERVICE FALL BACK

(75) Inventors: Yonggang Fang, San Diego, CA (US); Rajesh Bhalla, Gahanna, OH (US); Xiaowu Zhao, Shenzhen (CN); Ting Lu, Beijing (CN); Yuanfang Yu, Shenzhen (CN)

(73) Assignees: ZTE Corporation, Shenzhen (CN); ZTE (USA) Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/162,552

(22) Filed: Jun. 16, 2011

(65) Prior Publication Data
US 2012/0028661 A1  Feb. 2, 2012

Related U.S. Application Data

(63) Continuation-in-part of application No. 12/777,255, filed on May 10, 2010, now Pat. No. 8,781,509.

(60) Provisional application No. 61/176,877, filed on May 8, 2009, provisional application No. 61/187,244, filed on Jun. 15, 2009.

(30) Foreign Application Priority Data

Jun. 16, 2010  (WO) ................ PCT/CN2010/001121

(51) Int. Cl.
*H04W 4/12* (2009.01)
*H04W 36/00* (2009.01)
*H04W 76/02* (2009.01)

(52) U.S. Cl.
CPC ........ *H04W 36/0022* (2013.01); *H04W 76/026* (2013.01)
USPC ........... 455/466; 455/560; 455/428; 455/445; 370/466; 370/355; 370/356

(58) Field of Classification Search
CPC .......... H04W 4/12; H04W 4/14; H04W 48/10
USPC ...................... 455/428, 560, 445, 466, 552.1; 370/466, 912, 355, 356
See application file for complete search history.

(56) References Cited

U.S. PATENT DOCUMENTS 6,463,259 B1 * 10/2002 Kim ............................. 455/3.01
7,263,354 B2 * 8/2007 Naim et al. ................ 455/422.1

(Continued)

*Primary Examiner* — Kamran Afshar
*Assistant Examiner* — Farideh Madani
(74) *Attorney, Agent, or Firm* — Perkins Coie LLP

(57) ABSTRACT

Techniques, apparatuses, and systems include mechanisms for interworking circuit service fallback. In one implementation, a system for wireless communications can include one or more first base stations forming a first radio access network to provide wireless communications based on a first wireless technology; one or more second base stations forming a second radio access network to provide wireless communications based on a second wireless technology which is different from the first wireless technology, and an interworking service (IWS) module that is configured to provide the interworking between the first and second radio access networks for communications to a wireless device served by the system via either the first wireless technology or the second wireless technology, and uses a signal adaptation protocol to encapsulate messages in communicating with a wireless device served by the system. Other implementations are also provided in this document.

17 Claims, 29 Drawing Sheets

(56) References Cited

U.S. PATENT DOCUMENTS

| | | |
|---|---|---|
| 8,577,370 B1* | 11/2013 | Mann et al. .................. 455/436 |
| 2003/0129991 A1* | 7/2003 | Allison et al. ................ 455/456 |
| 2006/0050667 A1* | 3/2006 | Verma et al. ................. 370/338 |
| 2007/0097924 A1* | 5/2007 | Martinovich et al. ........ 370/332 |
| 2007/0173224 A1* | 7/2007 | Buckley et al. ............ 455/404.1 |
| 2007/0242622 A1* | 10/2007 | Voyer ........................... 370/254 |
| 2009/0022104 A1* | 1/2009 | Cherian et al. ................ 370/331 |
| 2009/0265543 A1* | 10/2009 | Khetawat et al. ............. 713/151 |
| 2010/0267383 A1* | 10/2010 | Konstantinou et al. .... 455/435.2 |
| 2010/0317378 A1* | 12/2010 | Fang et al. .................... 455/466 |

* cited by examiner

| Field | Length (bits) |
|---|---|
| MessageID | 8 |
| MessageSequence | 7 |
| AckRequired | 1 |
| 1xLogicalChannel | 2 |
| 1xSignalingLength | 16 |
| 1xSignaling | 1xSignalingLength x 8 |

*Fig. 11*

| Field | Length (bits) |
|---|---|
| MessageID | 8 |
| AckSequence | 7 |
| Reserved | 1 |

*Fig. 12*

| Field | Length (bits) |
|---|---|
| MessageID | 8 |
| AckSequence | 7 |
| RejectReason | 8 |
| Reserved | 1 |

*Fig. 13*

| Field | Length (bits) |
|---|---|
| MessageID | 8 |
| Reserved | TBD |

*Fig. 14*

Enhanced GCSNA Messages

| Field | Length (bits) |
|---|---|
| MessageID | 8 |
| GCSNAOption | 8 |
| AlternateGCSNAOption_INCL | 1 |
| NumAlternateGCSNAOptions | 0 or 8 |
| If NUMAlternateGCSNAOptions field is included, NumAlternateGCSNAOptions occurrences of the following field. Otherwise, 0 occurrences of the following field. | |
| AlternateGCSNAOption | 8 |
| IWSIDIncl | 1 |
| IWS_ID | 0 or 16 |
| CellIDIncl | 1 |
| NumCellIDs | 0 or 4 |
| If NumCellIDs is included, NumCellIDs occurrences of the following field. Otherwise, 0 occurrences of the following field. | |
| CellID | 8 |
| RadioMeasurementIncluded | 1 |
| PilotStrength | 8 |
| AckRequired | 1 |
| StopDupDetect | 1 |
| MessageSequence | 6 |
| Reserved | 0 to 7 |
| TLACEncapsulated1xL3PDU | Variable |

*Fig. 24*

INTERWORKING CIRCUIT SERVICE FALL BACK

CROSS REFERENCE TO RELATED APPLICATIONS

This application is a continuation-in-part application of and claims priority under 35 U.S.C. §120 of U.S. patent application Ser. No. 12/777,255, filed May 10, 2010, which claims benefit under 35 U.S.C. §119(a) of U.S. Provisional Patent Application No. 61/176,877, filed May 8, 2009 and U.S. Provisional Patent Application No. 61/187,244, filed Jun. 15, 2009. In addition, under 35 U.S.C. §119(a), this application claims priority from International Patent Application No. PCT/CN2010/001121, filed Jun. 16, 2010 under the Paris Convention. The entire contents of the before-mentioned patent applications are incorporated by reference as part of the disclosure of this application.

BACKGROUND

This document relates to wireless inter technology communications in wireless communication systems.

Wireless communication systems can include a network of one or more base stations to communicate with one or more wireless devices such as a mobile device, cell phone, wireless air card, mobile station (MS), user equipment (UE), access terminal (AT), or subscriber station (SS). Each base station emits radio signal that carry data such as voice data and other data content to wireless devices. A base station can be referred to as an access point (AP) or access network (AN) or can be included as part of an access network or a base station subsystem (BSS). Further, a wireless communication system can include a core network that is in communication with one or more base stations. A base station can transmit a radio signal on a forward link (FL), also called a downlink (DL), to one or more wireless devices. A wireless device can transmit a radio signal on a reverse link (RL), also called an uplink (UL), to one or more base stations.

A wireless device can use one or more different wireless technologies for communications. Various examples of wireless technologies include Code division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), evolved UTRAN (E-UTRAN), Long-Term Evolution (LTE), and Worldwide Interoperability for Microwave Access (WiMAX).

SUMMARY

This document describes technologies, among other things, for interworking circuit service fallback.

In one aspect, techniques, apparatuses, and systems for interworking circuit service fall back can include communicating with a first network based on a first wireless technology; communicating with a switching center corresponding to a second network based on a second wireless technology, where the switching center is configured to process messages for one or more devices on the second network; and transacting messages, in accordance with the second wireless technology, between a wireless device, communicating on the first network, and the switching center. Transacting messages can include communicating with the wireless device over the first network.

In another aspect, techniques, apparatuses, and systems for wireless communication systems can include communicating with a base station in accordance with a first wireless technology; and transacting messages, in accordance with a second wireless technology, with an interworking service that is in communication with a switching center associated with the second wireless technology. The transacted messages can include Short Message Service (SMS) messages. The transacted messages can include paging messages. The wireless device can initiate a changeover from the first network to the second network. The switching center can initiate the changeover from the first network to the second network.

In another aspect, a wireless communication system can include circuitry to communicate with a first network based on a first wireless technology; circuitry to communicate with a switching center corresponding to a second network based on a second wireless technology different from the first wireless technology, where the switching center is configured to process messages for one or more devices on the second network; and circuitry to communicate transact messages, based on the second wireless technology, between a wireless device, communicating on the first network, and the switching center, where the transacting messages includes communicating with the wireless device over the first network.

In another aspect, a wireless communication system can include circuitry to communicate with a base station based on a first wireless technology; and circuitry to transact messages, based on a second wireless technology different from the first wireless technology, with an interworking service that is in communication with a switching center associated with the second wireless technology.

In another aspect, a system for wireless communications can include one or more first base stations forming a first radio access network to provide wireless communications based on a first wireless technology; one or more second base stations forming a second radio access network to provide wireless communications based on a second wireless technology which is different from the first wireless technology, and an interworking service (IWS) module that is configured to provide the interworking between the first and second radio access networks for communications to a wireless device served by the system via either the first wireless technology or the second wireless technology, and uses a signal adaptation protocol to encapsulate messages in communicating with a wireless device served by the system.

In yet another aspect, a wireless communication device for wirelessly communicating based on a first wireless technology and a second wireless technology different from the first wireless technology can include a first communication mechanism that communicates with one or more first base stations forming a first radio access network of a wireless communication system to provide wireless communications based on the first wireless technology; a second communication mechanism that communicates with one or more second base stations forming a second radio access network of the wireless communication system to provide wireless communications based on the second wireless technology; and a message generation mechanism that operates based on a signal adaptation protocol to encapsulate messages in communicating via the first wireless technology or the second wireless technology and supports switching wireless communications between the first wireless technology and the second wireless technology.

The details of one or more implementations are set forth in the accompanying drawings, the description and the claims.

BRIEF DESCRIPTION OF THE DRAWINGS

FIG. 11 shows an example of a 1x signaling adaptation protocol 1x Transfer message.

FIG. 12 shows an example of 1x transfer acknowledgement message.

FIG. 13 shows an example of 1x transfer reject message.

FIG. 14 shows an example of 1x Circuit Switch Fall Back message.

FIG. 24 shows an example of an enhanced GCSNA protocol including the new fields of CDMA2000 cell information.

DETAILED DESCRIPTION

Figure 1:
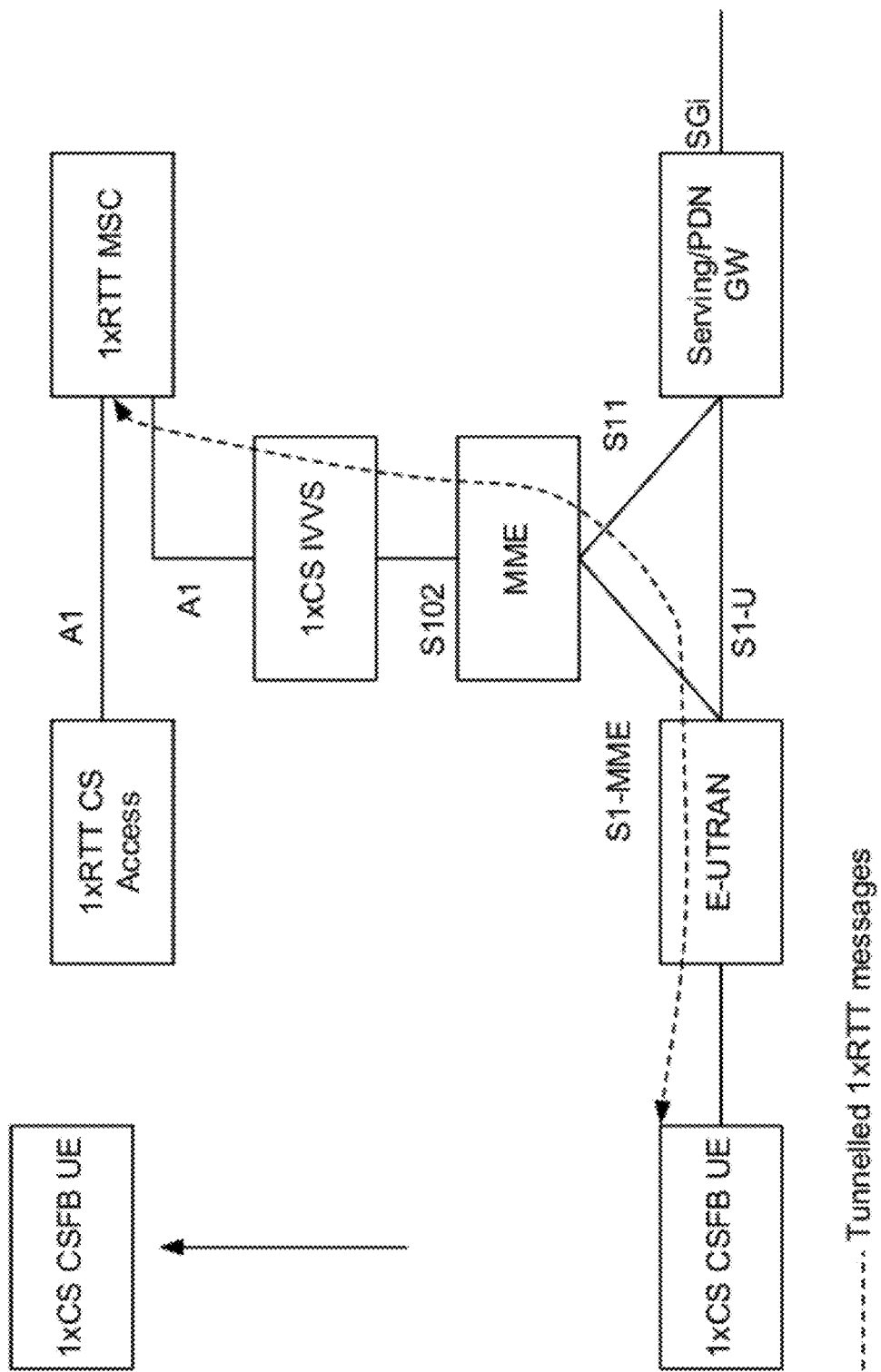
FIG. 1 shows an example of an interworking architecture reference model.

As the traditional voice services move toward the data centric services, the second generation (2G), third generation (3G) and fourth generation (4G) wireless communication networks such as CDMA2000 are evolving to the next generation Long Term Evolution (LTE), which is based on Orthogonal Frequency Division Multiplexing (OFDM) and multiple-input multiple-output (MIMO) technologies. LTE can provide more network capacity and peak data rate with less latency for the data services. This is key for users' experiences on data service. However, due to the high efficiency of CDMA technology in voice services, CDMA2000 1x network may still be used to provide the voice services even after the LTE network is widely deployed and used in a couple of year later. Therefore there will be a long period that CDMA2000 1x circuit switching and packet network co-exists with LTE network. A wireless communication system can provide one or more interworking mechanisms to smooth interworking for co-existing of multi-technology networks, e.g., CDMA2000 1x interworking with LTE.

An interworking mechanism can be implemented between CDMA2000 1x and LTE such as a single radio voice call continuity (SRVCC) interworking mechanism and a 1x Circuit Switch Fall Back (CSFB) mechanism. A SRVCC interworking mechanism is to address the voice call (VoIP) originated from LTE network and handoff to CDMA2000 1x network when the mobile station is moving out of LTE coverage but within CDMA2000 1x network coverage. This approach assumes that IMS (IP Multimedia Subsystem) were widely deployed in operator's Core network and VoIP would be used to provide the major voice services.

In 1x CSFB, when the mobile station is connecting to LTE network for the data service, a mobile switching center (MSC) in the CDMA2000 network can page the mobile station for voice service, e.g., a mobile terminated (MT) call, or the user may want to use the mobile station to originate a voice call, e.g., a mobile originated (MO) call. Due to a single radio shared by the multiple technologies, such as CDMA2000 and LTE, the mobile station has to tune its radio to CDMA2000 1x frequency from LTE frequency after the mobile station has to fall back to CDMA2000 1x network to perform the voice service. During 1x CSFB, the data service over the LTE network can be suspended.

This document describes techniques, apparatuses, and systems for interworking between different wireless technologies, and discloses, among other things, details and implementation examples relating to interworking Circuit Service Fall Back (CSFB). A CSFB mechanism can bridge two or more different wireless technologies to allow communications between the two or more technologies. For example, a wireless device operating on a first wireless technology can fall back to a second wireless technology by, for example, generating messages based on the second wireless technology and transmitting them over the air in accordance with the first wireless technology. In another example, a wireless device is connected to a LTE network and would like to receive a page or SMS (Short Message Service) from a CDMA2000 1x MSC, or send a SMS to a cdma2000 1x network, the wireless device can use the technologies described herein to communicate cdma2000 1x based messages over the LTE network. In some implementations, a wireless device operating on a first wireless technology can fall back to a second wireless technology by encapsulating the protocol of the second wireless technology within a transmission payload associated with the first wireless technology.

Various examples of wireless communication systems that can implement the present techniques and systems include, among others, wireless communication systems based Code division Multiple Access (CDMA) such as CDMA2000 1x, High Rate Packet Data (HRPD), evolved HRPD (eHRPD), Universal Mobile Telecommunications System (UMTS), Universal Terrestrial Radio Access Network (UTRAN), Evolved UTRAN (E-UTRAN), Long-Term Evolution (LTE), and Worldwide Interoperability for Microwave Access (WiMAX). For example, a wireless communication system can include one or more networks based on CDMA and one or more networks based on LTE.

FIG. 1 shows an example of an interworking architecture reference model. In this reference model, the wireless device, such as an UE, can attach to an E-UTRAN network to receive data services from LTE network. The 1x CSFB Interworking Service (IWS) is bridging the Mobility Management Entity (MME) and 1x RTT MSC so that 1x MSC and the wireless device could communicate over LTE network. During the wireless device connecting to LTE network, the IWS can be used to tunnel 1x registration message, SMS, and handoff direction message for VoIP. When the 1x MSC needs to page the wireless device, it can send the page request message through IWS, MME and E-UTRAN tunnel to the wireless device. After receiving the page request message, the wireless device will fall back to 1x network and continue the 1x circuit switching call. In addition to CSFB for MT call, the wireless device can fall back to CDMA2000 1x network for MO call.

A wireless communication system can provide interworking based on using a Generic Multiple Virtual Link Interworking Service (GMVL-IWS) Architecture. The GMVL-IWS Architecture can provide a mechanism to encapsulate wireless network procotols.

Figure 2:
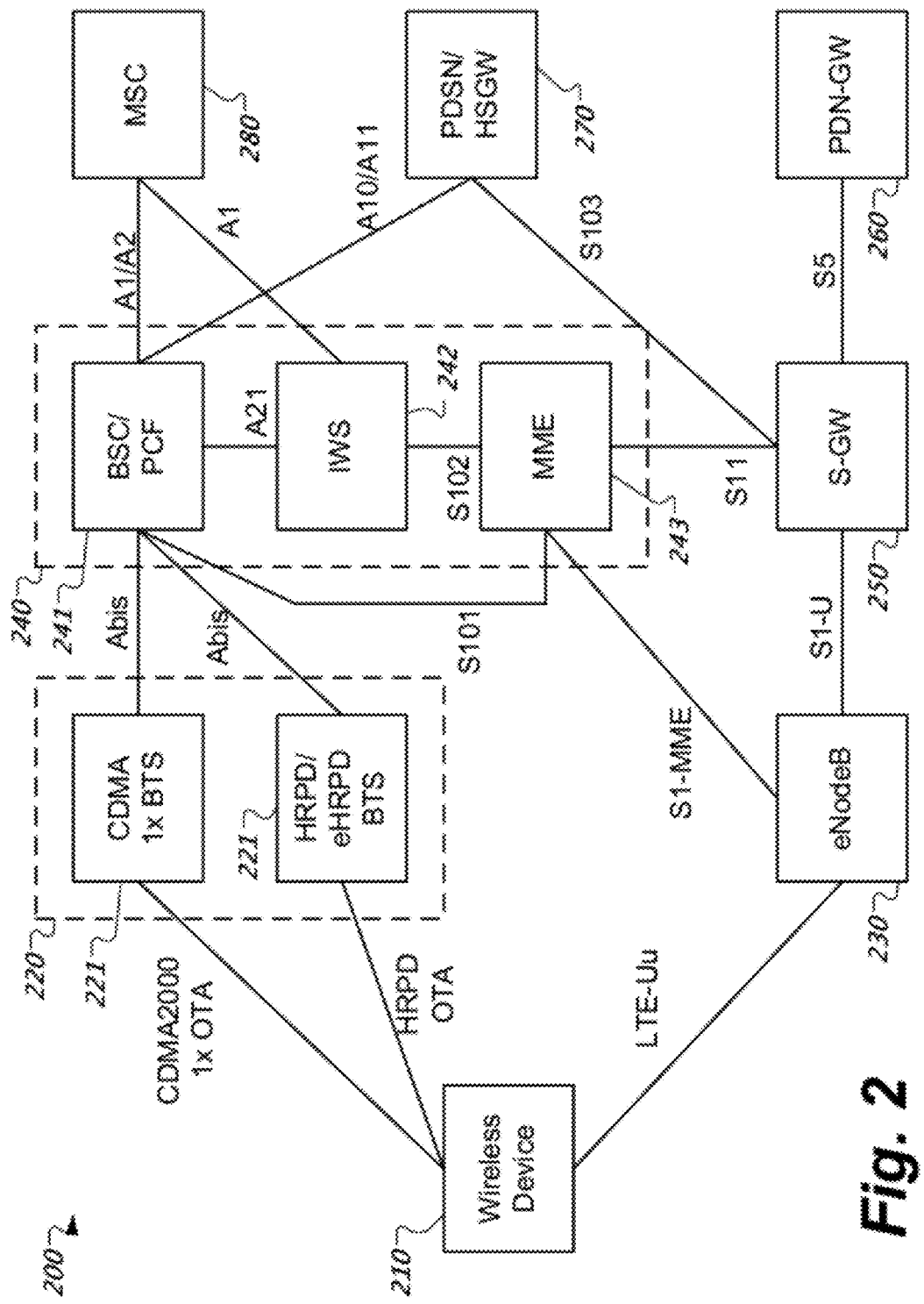
FIG. 2 shows an example of a Generic Multiple Virtual Link Interworking Service Architecture.

FIG. 2 shows an example of a Generic Multiple Virtual Link Interworking Service (GMVL-IWS) Architecture. A system 200 based on a GMVL-IWS Architecture can include one or more multi-mode wireless devices 210, a CDMA2000 base station 220, an eNodeB 230, a network control node 240, an IWS 242, a MME 243, a Serving Gateway (S-GW) 250, a Mobile Switching Center (MSC) 280, a PDSN/HRPD Serving Gateway (HSGW) 270, and a packet data network gateway (PDN-GW) 260.

Multi-mode wireless devices 210 can provide wireless connections to different wireless technology networks. A CDMA2000 base station 220 includes a CDMA2000 1x radio base transceiver station (BTS) 221 and a CDMA2000 HRPD radio base transceiver station (BTS) 222. The CDMA2000 base station 220 provides the voice and data services over the air connection to wireless device 210 using CDMA2000 1x technology and HRPD technology. The eNodeB 230 is a wireless base station in LTE network to provide the over the air (e.g., LTE-Uu) connection to the wireless device 210. In some implementations, circuitry for the CDMA2000 base station 220 is integrated with circuitry for the eNodeB 230. In some implementations, a radio control unit can implement multiple radio access technologies such as LTE and CDMA2000. In some implementations, a base station controller (BSC) can include a Policy Control Function (PCF).

The network control node 240 can include a BSC/PCF 241, an IWS 242, and a MME 243. The BSC/PCF 241 is a base station controller for control of the CDMA2000 base station 220 over an Abis interface. The MME 243 is a network entity used to control the eNodeB 230 over S1-MME interface. The IWS 242 is configured to support different wireless technologies interworking. The IWS 242 is connected to BSC/PCF 241 over an A21 interface. The IWS 242 is connected to the MME 243 over a S102 interface. The IWS 242 can tunnel CDMA2000 1x messages between a wireless device 210 and a MSC 280 over an A1 interface.

The S-GW 250 can provide packet routing function in a LTE network. The S-GW 250 can connect to the eNodeB 230 over a S1-U interface. The S-GW 250 can connect to the MME 243 over a S11 interface. A MSC 280 can provide mobile voice services in a circuit switching network. A serving gateway such as a PDSN/HSGW 270 is a serving gateway for a CDMA2000 radio access network connecting to a LTE core network. The PDSN/HSGW 270 can connect to a BSC/PCF 241 over an A10/A11 interface. The PDSN/HSGW 270 can connect to the S-GW 250 over a S103 interface. A PDN-GW 260 connects to the S-GW 250 over a S5 interface.

The multiple virtual link interworking services architecture provides a generic 1x CSFB framework across different wireless technologies. An IWS can provide a Virtual Link Interworking connection across one or more wireless technologies networks. The GMVL-IWS can support one or more logical channels, based on a first wireless technology, between a switching center such as a MSC 280 and a wireless device 210.

The multiple virtual link interworking service architecture supports different implementation and deployment options of interworking services.

Figure 3:
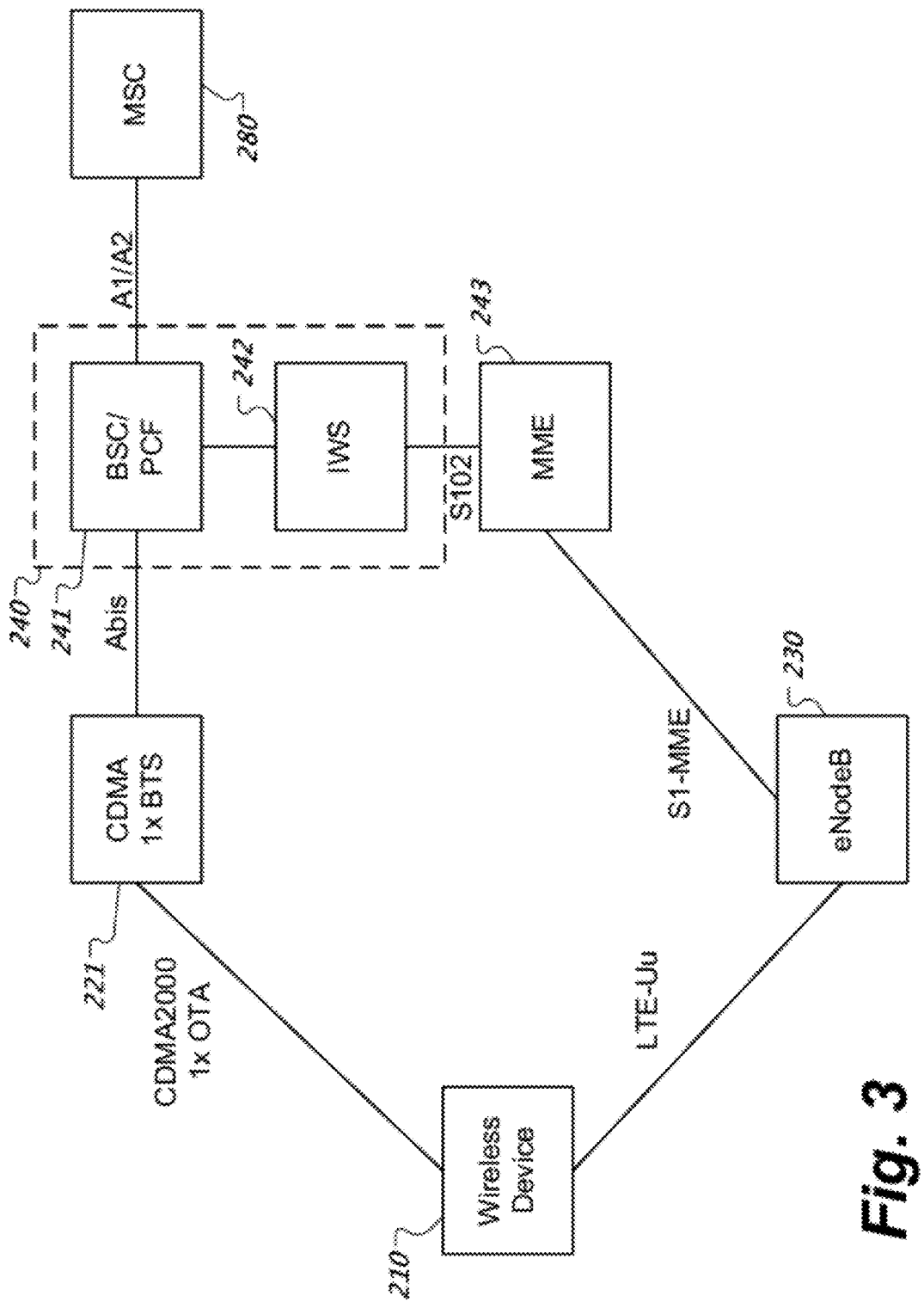
FIG. 3 shows an example of a multiple virtual link interworking service architecture for a 1x Circuit Switch Fall Back.

FIG. 3 shows an example of a multiple virtual link interworking service architecture for a 1x CSFB. This architecture can support wireless technology fallbacks such as an LTE to 1x fallback. In this example, IWS 242 is integrated into a BSC/PCF node 241. An integrated BSC and IWS can be referred to as a BSC-lite IWS. When IWS 242 is integrated into BSC 241, it could use an A1/A2 or A1p/A2p interfaces in the BSC to connect to the MSC 280 to tunnel the CDMA2000 1x messages between MSC 280 and wireless device 210. The A1 interface between the IWS 242 and the MSC 280 can be shared with the A1 interface between the BSC 241 and the MSC 280. In some implementations, the IWS 242 is a standalone node configured to provide 1x CSFB service.

Figure 4:
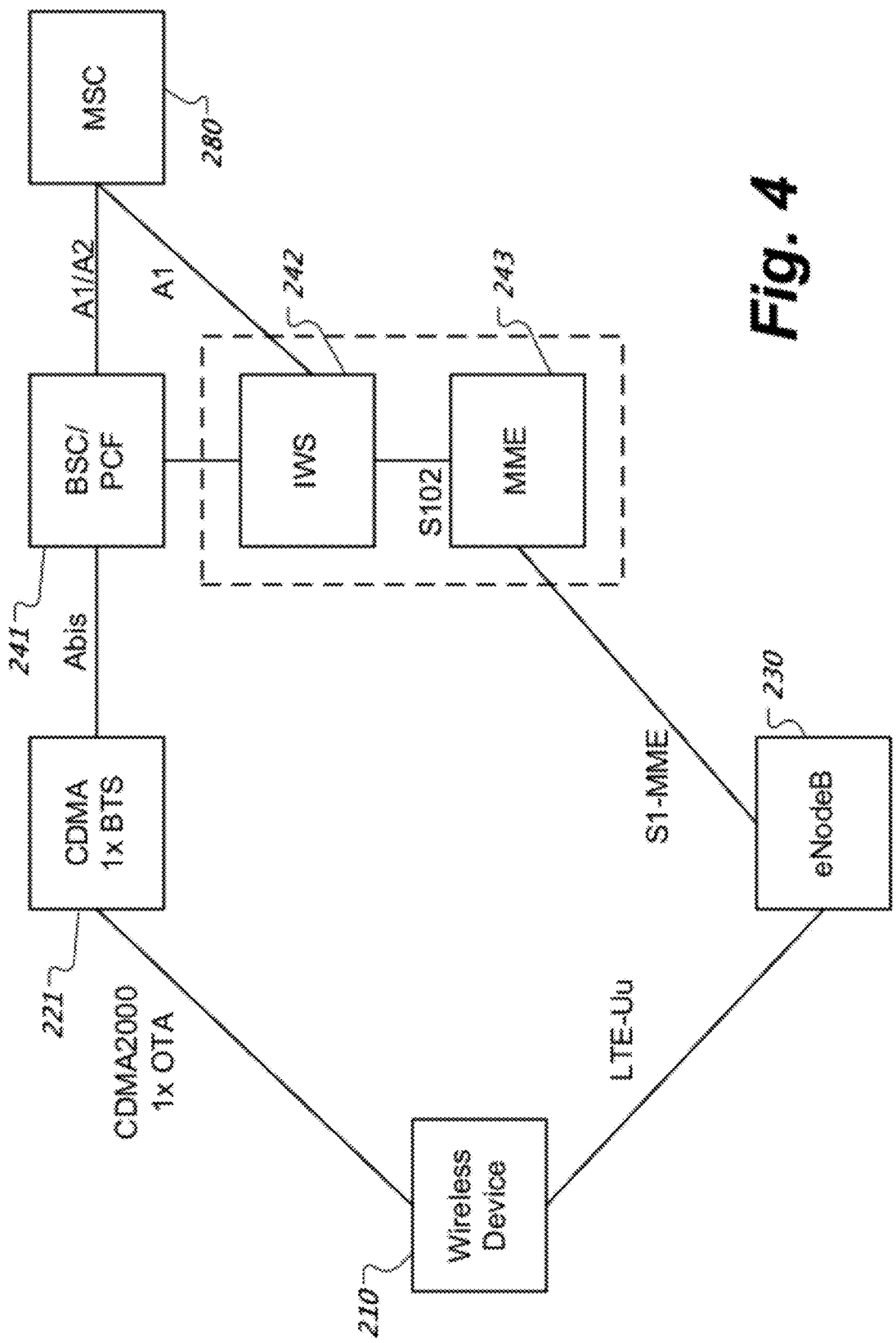
FIG. 4 shows another example of a multiple virtual link interworking service architecture for a 1x Circuit Switch Fall Back.

FIG. 4 shows another example of a multiple virtual link interworking service architecture for 1x CSFB. In this example, IWS 242 is integrated into the MME 243, and the interface S102 is an internal interface between IWS 242 and MME 243. This architecture can support wireless technology fallbacks such as an LTE to 1x fallback.

Figure 5:
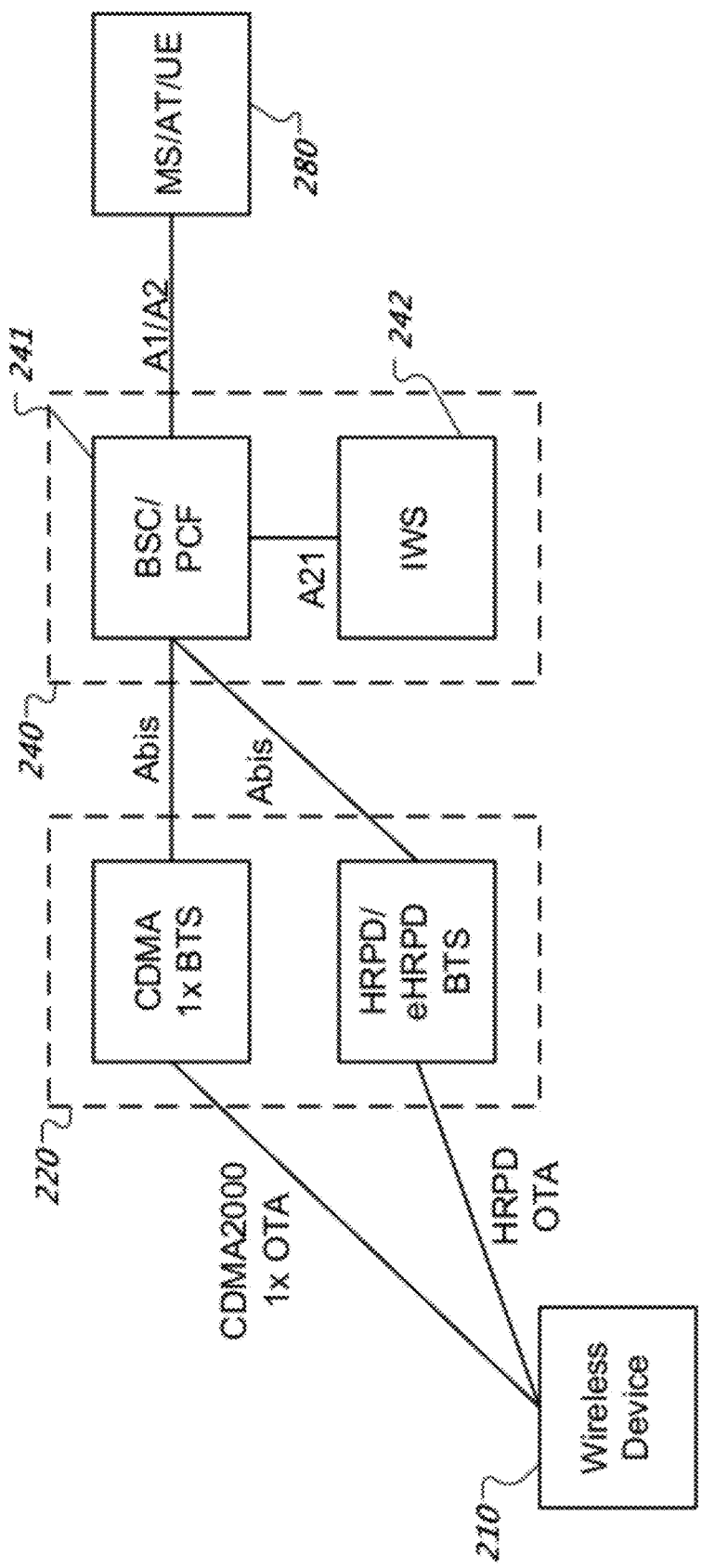
FIG. 5 shows an example of a multiple virtual interworking service architecture for a 1x Circuit Switch Fall Back from HRPD.

FIG. 5 shows an example of a multiple virtual interworking service architecture for 1x CSFB from HRPD. In this example, the A21 interface between the BSC 241 and IWS 242 is an internal interface. The IWS 242 can use an A1/A2 or A1p/A2p interfaces of BSC 241 to connect to the MSC 280 to tunnel CDMA2000 1x messages between the MSC 280 and wireless device 210. The A1 interface between the IWS 242 and the MSC 280 can be shared with the A1 interface between the BSC 241 and the MSC 280. This architecture can support wireless technology fallbacks such as an HRPD to 1x fallback.

In some implementations, the BSC, IWS and MME are integrated together into a single network node. Therefore, related interfaces such as A21 and S102 would become the internal interfaces of network node 240. IWS 242 can use the A1/A2 or A1p/A2p interfaces to tunnel CDMA2000 1x messages between the MSC 280 and the wireless device 210.

A multiple virtual link interworking can provide a 1x Signal Adaptation Protocol (SAP). A 1x SAP can provide a tunneling mechanism between a 1x MSC and wireless device.

Figure 6:
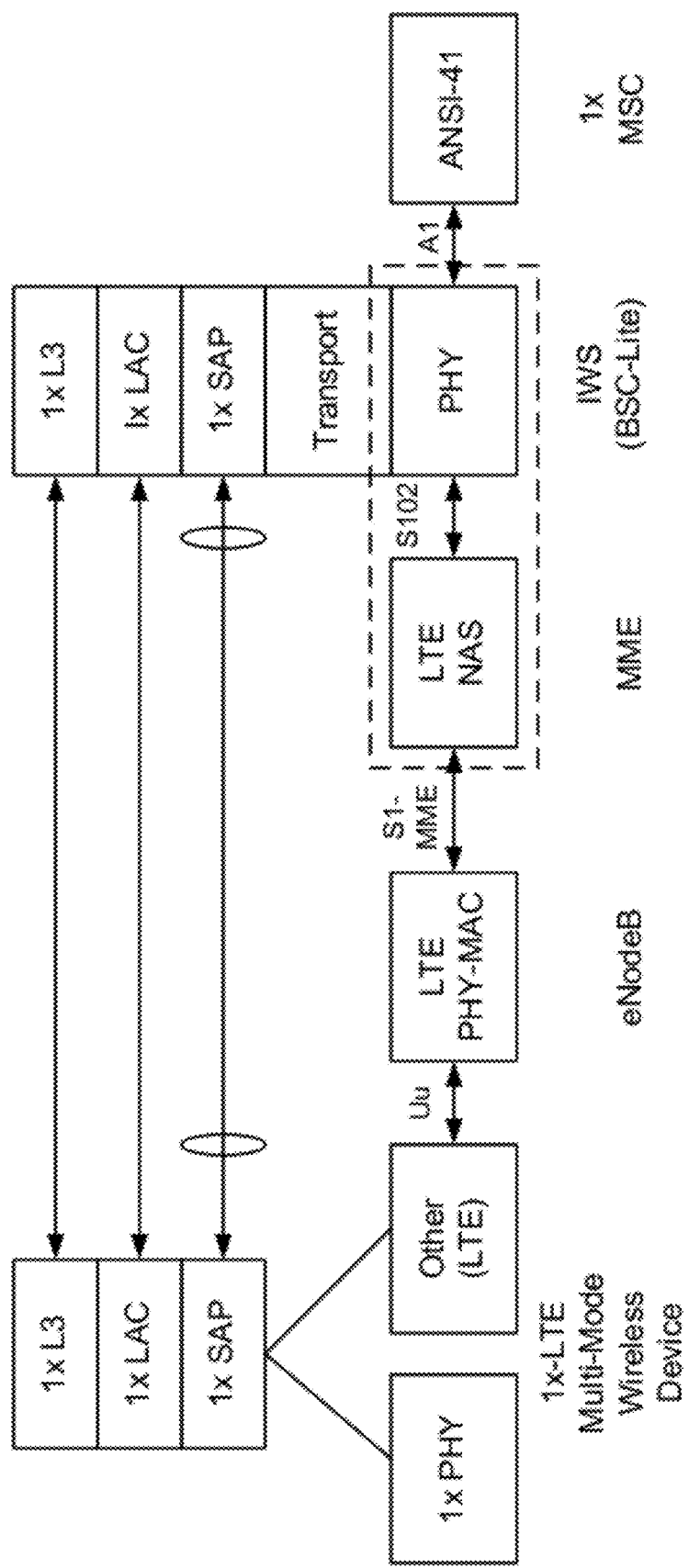
FIG. 6 shows an example of an interworking protocol stack for a multiple virtual link interworking architecture.
Figure 7:
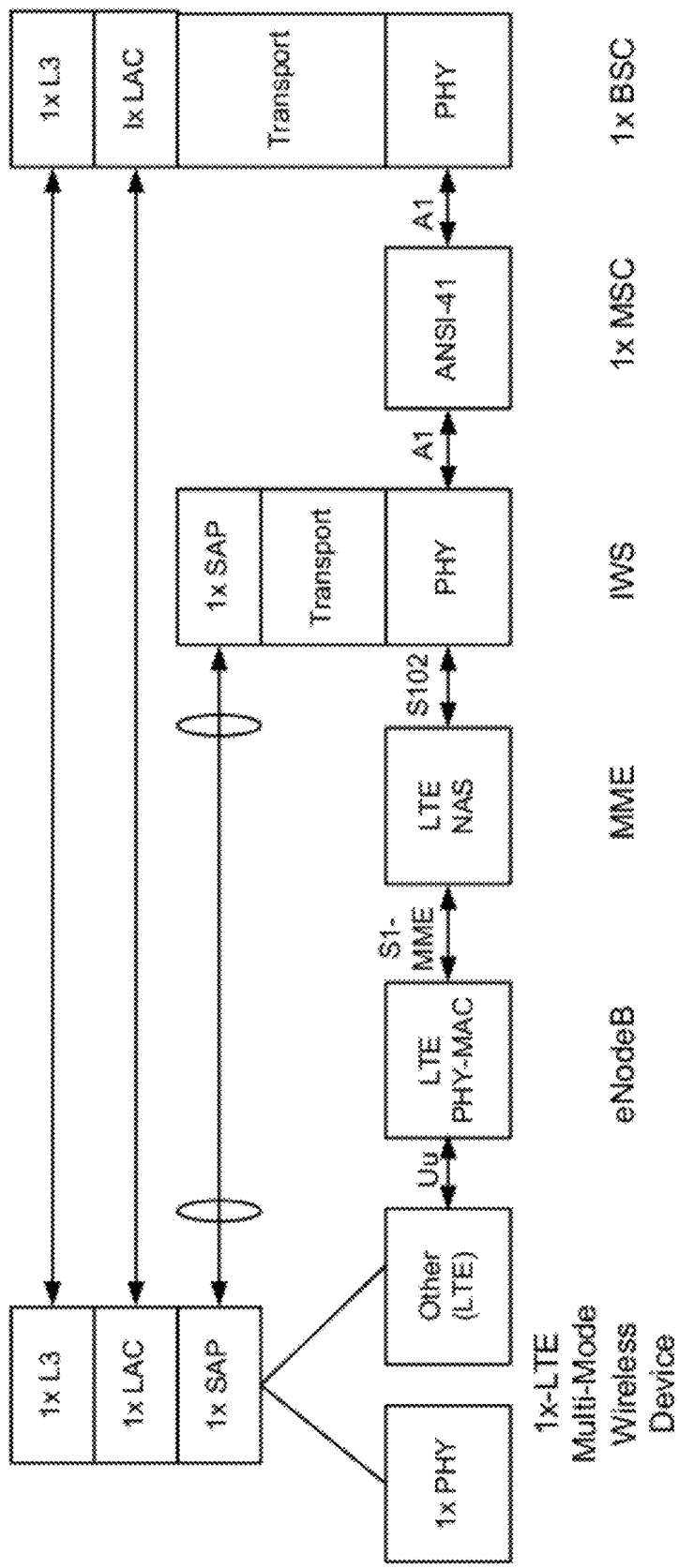
FIG. 7 shows another example of an interworking protocol stack for a multiple virtual link interworking architecture.
Figure 8:
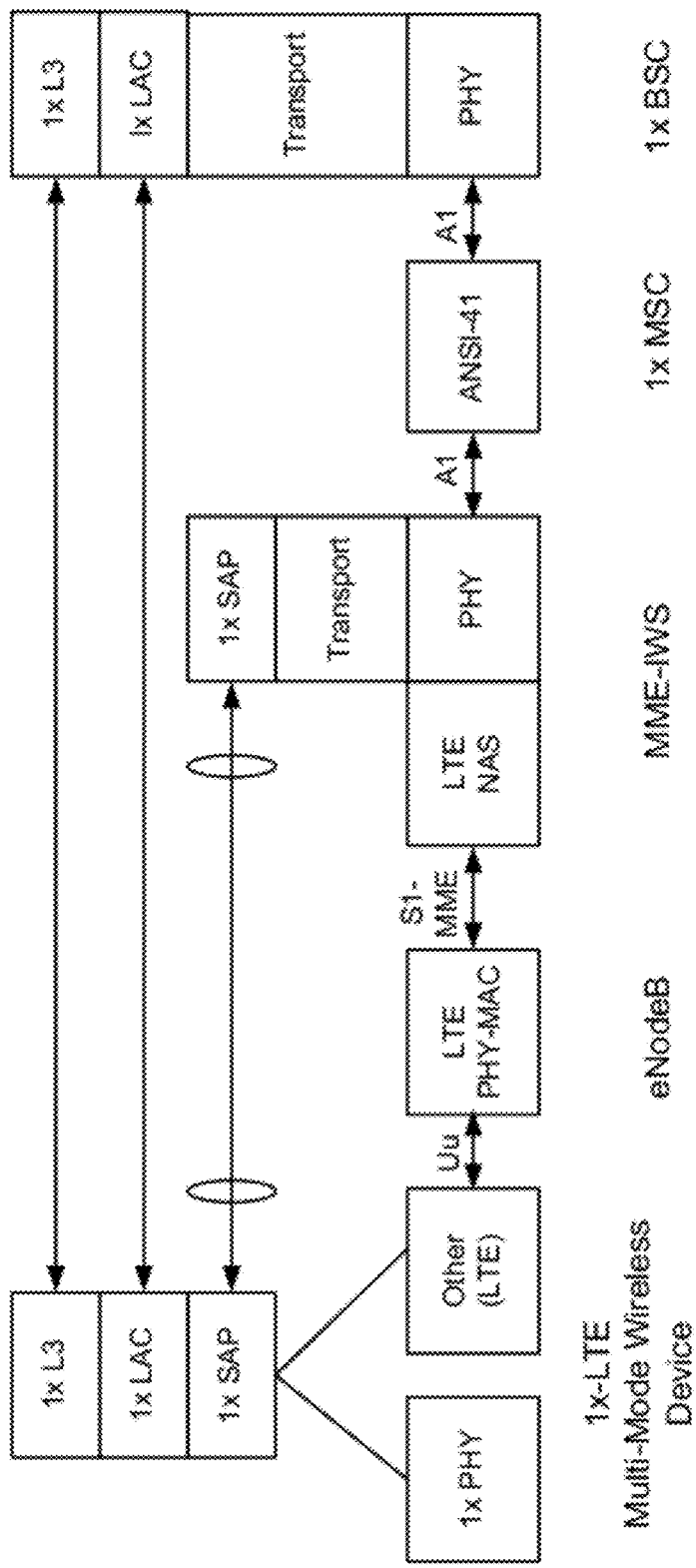
FIG. 8 shows an example of interworking protocol stack for an interworking architecture with an interworking service integrated with a mobility management entity.

FIG. 6 shows an example of interworking protocol stack for a BSC-Lite multiple virtual link interworking architecture. FIG. 7 shows an example of interworking protocol stack for a standalone multiple virtual link interworking architecture. FIG. 8 shows an example of interworking protocol stack for an interworking architecture with an IWS integrated with a MME.

An IWS can use an Interworking Protocol Stack to communicate with multi-mode wireless device. In some implementations, an Interworking Protocol Stack can include a generic 1x Signal Adaptation Protocol (1x SAP). The generic 1x SAP can provide a switch function between wireless technologies, and can encapsulate messages such as cdma2000 1x messages, e.g., registration, Short Message Service (SMS) and/or paging messages.

The generic 1x SAP can provide multiple virtual connections of 1x logical channels (f/r-csch or f/r-dsch) between a wireless device and BSC/MSC on a cdma2000 1x network. When the multi-mode wireless device 210 is connecting to LTE network, the generic 1x SAP on the wireless device 210 is used to provide a virtual connection through IWS 242 to MSC 280 over LTE network. When the multi-mode wireless device 210 is connecting to HRPD network, the generic 1x SAP on the wireless device 210 is used to provide a virtual connection through IWS 242 to MSC 280 over HRPD network. A logical channel field in the generic 1x SAP message can be used to associate the encapsulated message with a cdma2000 1x logical channel (f/r-csch or f/r-dsch) so as to form a virtual connection to the upper layer logical channel.

Figure 9:
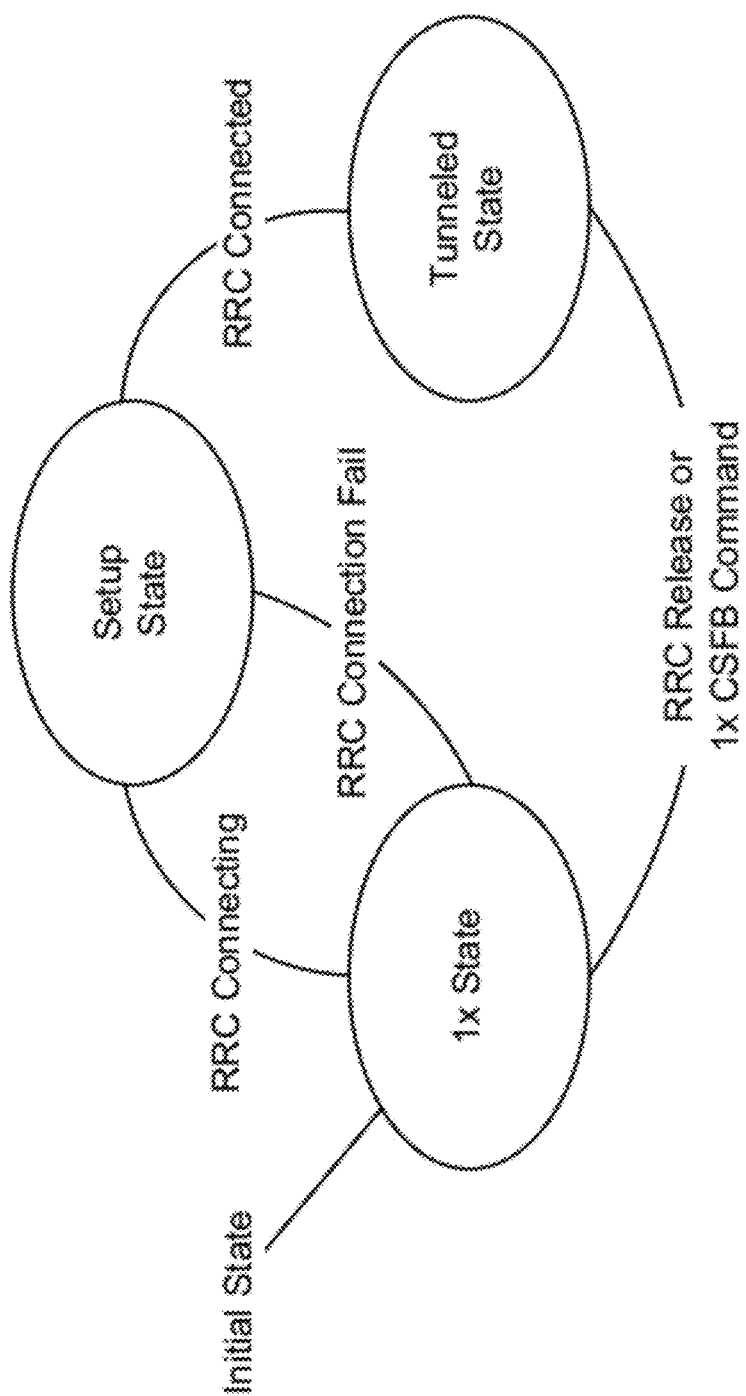
FIG. 9 shows an example of a 1x Signal Adaptation Protocol wireless device state transit diagram for Circuit Switch Fall Back from LTE.

FIG. 9 shows an example of a 1x Signal Adaptation Protocol wireless device state transit diagram for CSFB from LTE. At initialization, a 1x SAP mechanism enters the 1x State. In the 1x State, a radio module is tuned to a CDMA2000 1x frequency. In some implementations, a CDMA2000 1x upper layer signaling can go through the 1x connection directly. Based on a network searching priority configured in a RUIM/SIM card or neighbor technology information broadcast in CDMA2000 1x overhead message, the wireless device can attach a network. If a LTE network has a higher priority over a CDMA2000 network, then wireless device will start to search for a LTE network. Otherwise, the multi-mode wireless device can attach to a 1x network.

Assume the wireless device will attach to a LTE network. After leaving the 1x State, the single radio on the wireless device is tuned to a LTE frequency and the generic 1x SAP can enter the Setup State upon sending RRC (radio resource control) connection. If the RRC is connected, the generic 1x SAP can enter the Tunneled State in which the generic 1x SAP can tunnel the CDMA2000 1x messages over the LTE network. If RRC connection fails, the generic 1x SAP can go back from the Setup State to the 1x State. The generic 1x SAP can stay at the Tunneled State until RRC is released or 1x SAP receives 1x CSFB command and then go back to the 1x State.

If the wireless device does not find LTE signaling, the device can go back to attach to a 1x network. The device may periodically tune away from 1x to scan the LTE signals depending on the configuration of network selection.

Figure 10:
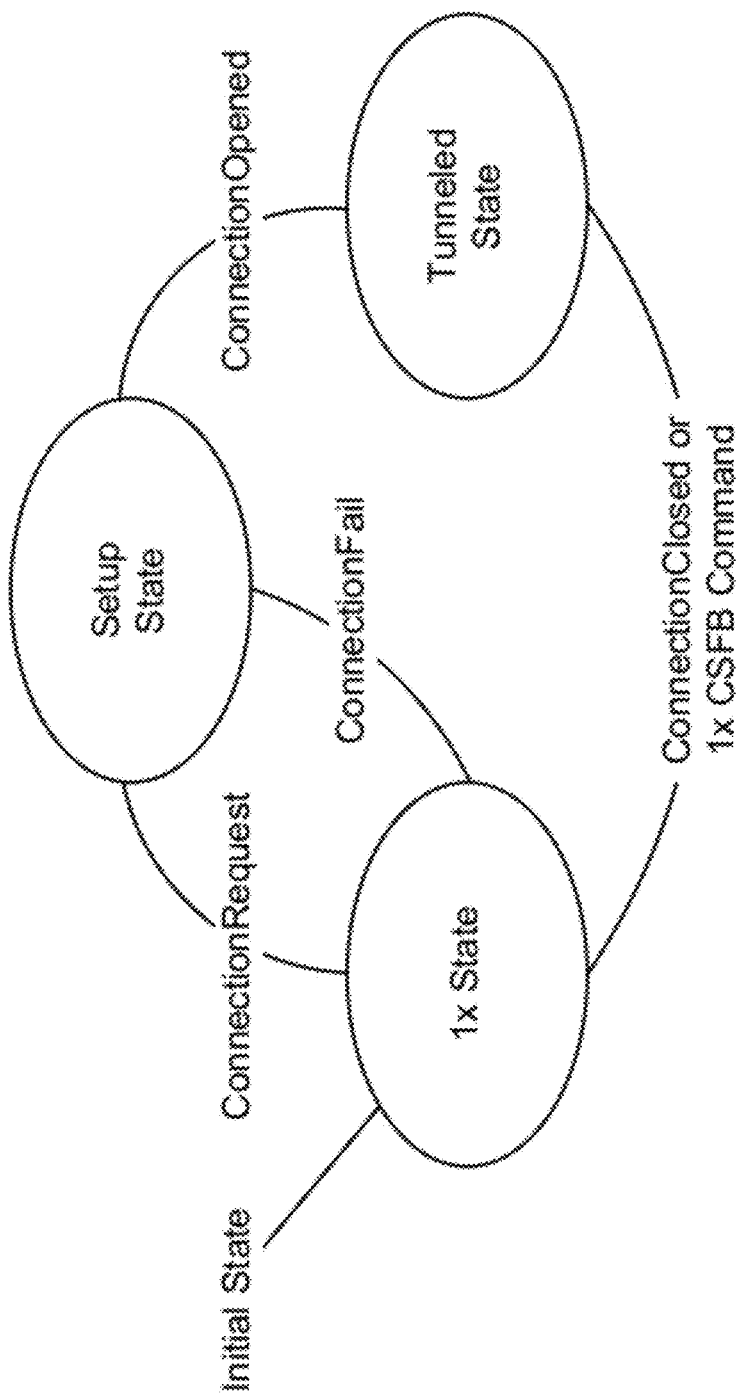
FIG. 10 shows an example of a 1x Signal Adaptation Protocol wireless device state transit diagram for Circuit Switch Fall Back from HRPD.

FIG. 10 shows an example of a 1x Signal Adaptation Protocol wireless device state transit diagram for CSFB from HRPD. At initialization, a 1x SAP mechanism enters the 1x State. If the wireless device is configured with a HRPD network having a higher priority, the wireless device can switch its radio to HRPD and the generic 1x SAP can enter Setup State when it decides to search for HRPD network and a ConnectionRequest message is sent. If the connection to HRPD is opened, the generic 1x SAP will enter Tunneled State and the wireless device can communicate the 1x messages over HRPD network. Otherwise, the generic 1x SAP will go back to 1x State. The generic 1x SAP will remain in Tunneled State until the HRPD connection is closed, and then go back to 1x State.

The multi-mode wireless device can use the generic 1x SAP states to determine the radio connection to either CDMA2000 1x or LTE or HRPD. When the generic 1x SAP is in 1x State, the radio is tuned to 1x frequency. When the generic 1x SAP is in other States, the radio can connect to either the LTE or HRPD network based on the configuration of the network selection and network availability. If the network selection priority order configured in RUIM/SIM or broadcast in overhead system parameters is LTE, HRPD and 1x, the wireless device can try to attach to LTE first. If attaching to LTE network succeeds, the wireless device can stay in connection to LTE until the connection is released or CSFB to 1x network.

GMVL-IWS can provide mechanisms for cdam2000 1x fallback from different technology networks. In some implementations, GMVL-IWS can comply with 3GPP LTE and cdma2000 1x CSFB architectures. A 1x-SAP mechanism can be used to carry 1x related information over different technologies to support LTE or WiMAX 1x CSFB. GMVL-IWS can provide flexible implementation options.

FIG. 11 shows an example of a 1x SAP 1x Transfer message. A 1x SAP 1x transfer message can be used to encapsulate CDMA2000 1x messages. In a 1x Transfer message, a message ID is used to identify the 1x transfer message. The 1x SAP, as disclosed herein, can support duplicated message detection and acknowledgement (ACK) based retransmission. The MessageSequence and ACKRequired fields are used for the duplicated message detection and retransmission. If the duplicated message detection and retransmission is required, the sender sets ACKRequired field to "1" and MessageSequence field to one more than the MessageSequence field of the last message requiring acknowledgement sent by the sender. The 1x logical channel field is used to indicate the encapsulated 1x message to be carried over the logical channel in native CDMA2000 1x network. The wireless device, acting as the sender, sets this field to "0" if the encapsulated 1x signaling is transmitted over a virtual r-csch; or sets to "1" if transmitted over virtual r-dsch. An IWS, acting as the sender, can set this field to "0" if the encapsulated signaling is transmitted over virtual f-csch; or set to "1" if transmitted over virtual f-dsch. The 1x SignalingLength and 1x Signaling fields defines a container to carry 1x signaling. The 1x Signaling field can include a CDMA2000 1x signaling packet data unit (PDU) which length is set by a 1x SignalingLength field.

There are multiple options to carry CDMA2000 1x messages using a 1x SAP as described herein. Option One is to specify the generic 1x SAP can only carry a set of 1x messages used for 1x registration, SMS, MO and MT call. Option Two is not to limit any 1x message carried by the generic 1x SAP. If Option One is used, the 1x SAP is required to perform a special filtering function for each message transmitting over the logical channels. If the message is not defined in the generic 1x SAP encapsulation list, the generic 1x SAP can send a 1x Transfer Reject message.

Communications based on 1x SAP can include a 1x transfer acknowledgement message, a 1x transfer reject message, and a 1x CSFB message.

FIG. 12 shows an example of 1x transfer acknowledgement message. If the duplicated message detection and retransmission is required, the receiver can send the 1x Transfer Ack message to the sender.

FIG. 13 shows an example of 1x transfer reject message. If the 1x SAP does not support of transferring 1x message, the receiver can send 1x Transfer Reject message to the sender.

FIG. 14 shows an example of 1x CSFB message. A 1x CSFB message is used by IWS to indicate wireless device to switch back to CDMA2000 1x network at the last signaling exchange over a tunnel.

A wireless communication system can provide a mechanism for 1x CSFB registration. In some implementations, a wireless device is required to register with the CDMA2000 1x network so that the 1x MSC is able to page the wireless device when it attaches to a LTE network. When a wireless device is registered with a MSC through an IWS, the MSC can treat the IWS as a network node similar to a BSC. When a circuit switch call is coming for the wireless device, the MSC can send a page request to the IWS which the wireless device is registered through.

The 1x registration process is triggered when the wireless device detects the registration zone change or band class information change. The registration zone information and band class information could be broadcast in SIB-8 message of eNodeB or unicast in CDMA2000 1x System Parameters from IWS through eNodeB. When the wireless device attaches to a LTE network, and moves into a different IWS from a previous one which the 1x registration is sent through, the wireless device is required to register again. If the wireless device falling back to 1x network for 1x circuit switch services returns to LTE network, the wireless device is required to register with 1x MSC again. To trigger the 1x registration, the native CDMA2000 1x network and the CDMA2000 system parameters unicast from IWS through eNodeB could be configured in different registration zones or different band classes.

Figure 15:
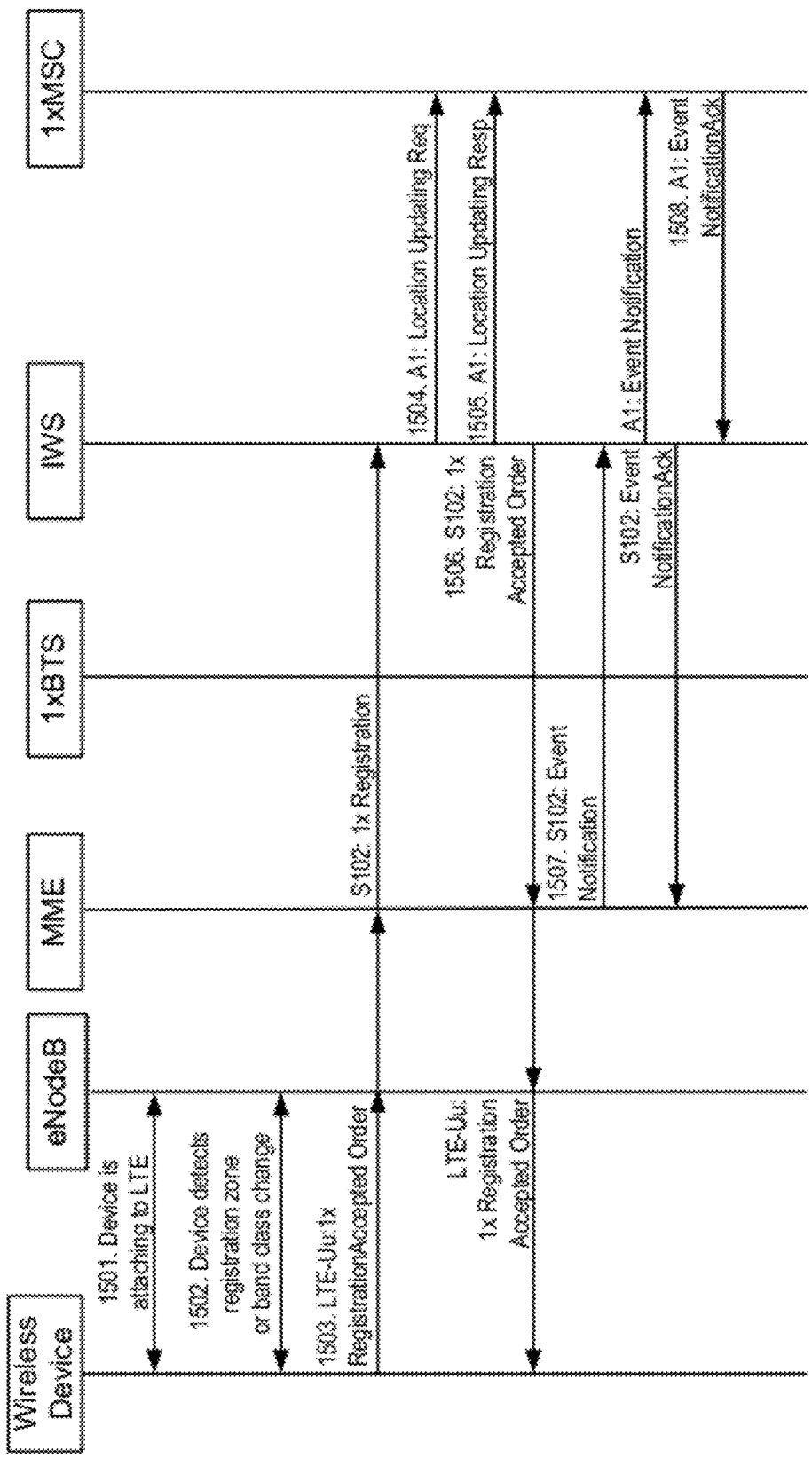
FIG. 15 shows an example of a 1x Circuit Switch Fall Back registration call flow.

FIG. 15 shows an example of a 1x CSFB registration call flow. At 1501, a wireless device attaches to a LTE network in Active State. At 1502, the wireless device detects the registration zone or band class change. At 1503, the wireless device sends an encapsulated 1x registration to the IWS over a LTE tunnel through an eNodeB and MME. At 1504, the IWS sends a Location Update Request to MSC/VLR At 1505, the MSC/VLR responds with a Location Update response to the IWS. At 1506, the IWS can keep the location information for the wireless device and send a Registration Accept Order to the wireless device over a LTE tunnel. At 1507, the MME can send an Event Notification to the IWS and forward to the MSC once the wireless device changes its connection status in LTE. The MSC can use this information to track the wireless device. At 1508, the MSC sends an acknowledgement to the Event Notification.

Figure 16:
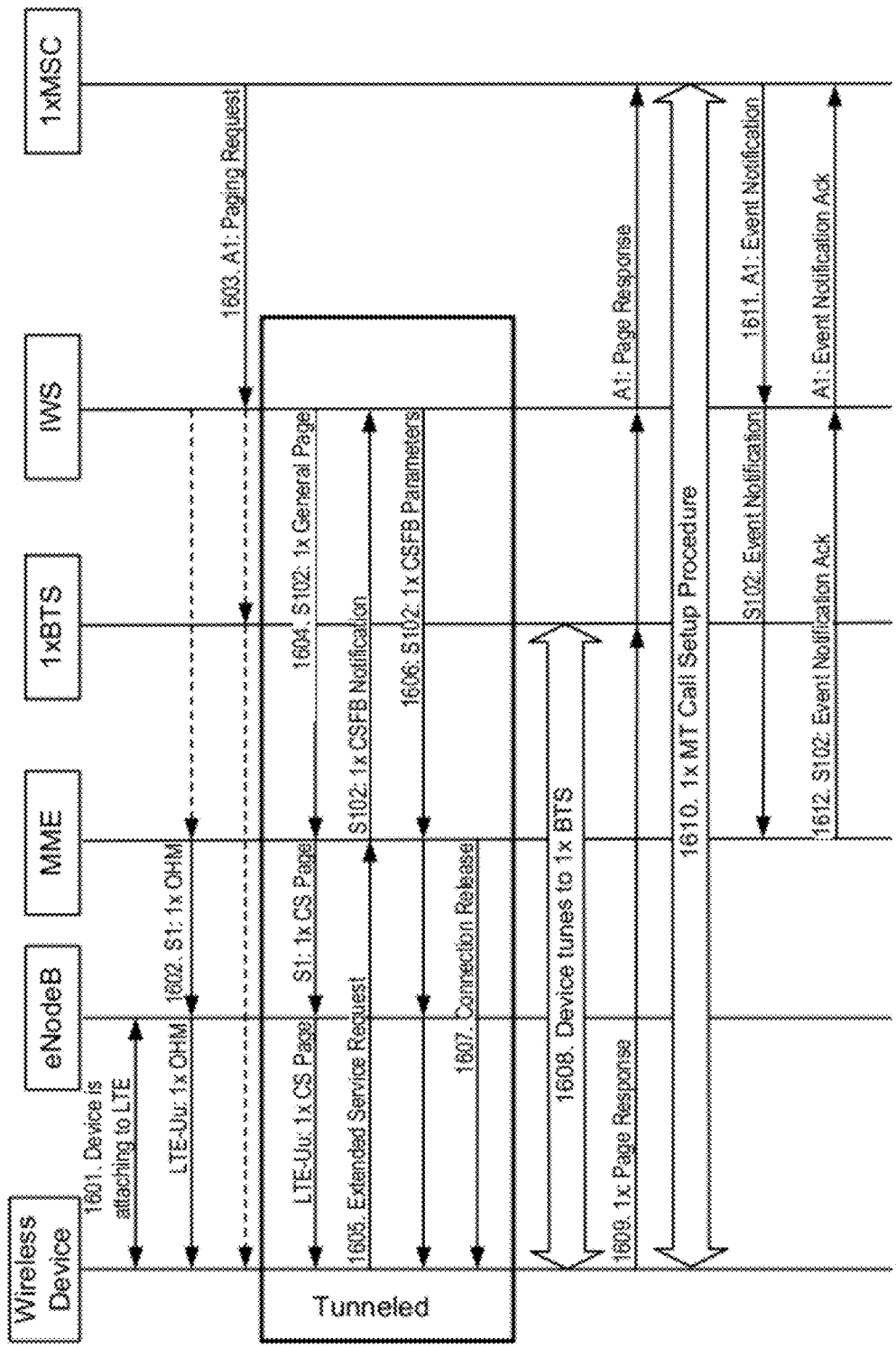
FIG. 16 shows an example of a 1x Circuit Switch Fall Back call flow for a mobile terminated call

FIG. 16 shows an example of a 1x CSFB call flow for a mobile terminated call. A wireless device has completed registration with a CDMA2000 1x network, At 1601, the wireless device attaches to a LTE network. At 1602, the MME broadcasts 1x System Parameters in SIB-8. The wireless device receives and stores the parameters. At 1603, based on a tracking record, 1x MSC knows that the wireless device attaches to the LTE network and sends a Page Request message to IWS. At 1604, the IWS sends the 1x circuit switch page through a LTE tunnel via MME and eNodeB to the wireless device. The IWS can send a 1x circuit switch page through 1x BTS for the case that the wireless device is in LTE-Idle. At 1605, the wireless device sends an Extended Service Request message to the MME to indicate to switch back to CDMA2000 1x network. The MME can send a 1x CSFB Notification to the IWS. At 1606, the IWS can send 1x CSFB parameters through the eNodeB to the wireless device to assist the wireless device to acquire the CDMA2000 1x signal. At 1607, the MME releases and redirects the wireless device to the CDMA2000 1x network. At 1608, the wireless device can use the stored 1x system information to tune its radio to a 1x frequency. At 1609, the wireless device sends the a 1x Page Response to the IWS through the 1x BTS. At 1610, the wireless device and 1x BTS performs a 1x mobile terminal call setup procedure. At 1611, the 1x MSC sends an Event Notification to notify the MME through the IWS that the wireless device is connecting to the 1x network. At 1612, the MME sends an acknowledgement based on the Event Notification.

Figure 17:
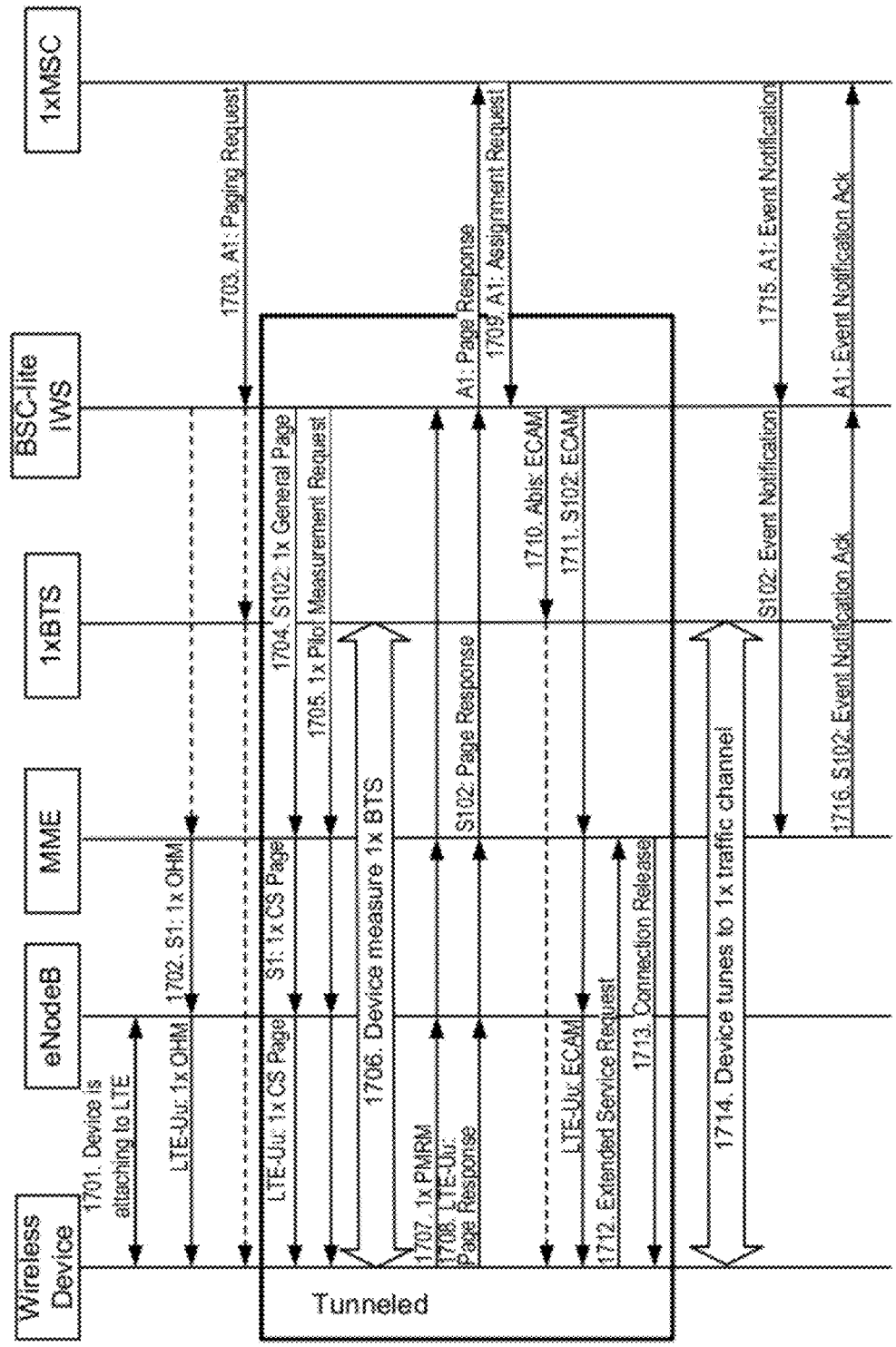
FIG. 17 shows another example of a 1x Circuit Switch Fall Back call flow for a mobile terminated call.

FIG. 17 shows another example of a 1x CSFB call flow for a mobile terminated call. This example uses a BSC-Lite IWS. In this example, the 1x CSFB call flow is optimized by tunneling Page Response and Extended Traffic Channel Assignment message over a LTE network to reduce the mobile terminated call setup time. At 1701, a wireless device completed registration with a 1x network and attaches to a LTE network. At 1702, the MME broadcasts 1x system parameters in SIB-8. The wireless device receives and stores the 1x system parameters. At 1703, the 1x MSC sends a Page Request to the IWS.

At 1704, the IWS sends the 1x circuit switch Page through a LTE tunnel via the MME and the eNodeB to the wireless device. The IWS can send a 1x circuit switch page through the 1x BTS for the case that the wireless device is in a LTE-Idle state. At 1705, the IWS can send a Pilot Measurement Request to the wireless device over the tunnel. At 1706, the wireless device measures a 1x BTS pilot signal in a measurement gap. At 1707, the wireless device reports measurement result in a Power Measurement Report Message (PMRM) to the IWS over the LTE tunnel. At 1708, the wireless device sends a 1x Page Response message to the IWS over the LTE tunnel and to the MSC.

At 1709, the MSC sends an Assignment Request to the IWS. At 1710, the IWS sends an extended channel assignment message (ECAM) to the 1xBTS. Based on the ECAM, the 1x BTS allocates a radio resource to sets up a traffic channel on the BTS side to reduce the call setup time. At 1711, the IWS sends an ECAM to the wireless device over the tunnel to request to setup a traffic channel. In some implementations, the IWS sends a 1x CSFB Command to trigger 1x SAP switch over. In some implementations, the wireless device automatically triggers the switch over by itself. Based on receiving the ECAM, at 1712, the wireless device sends an Extended Service Request message to the MME to indicate to switch to the CDMA2000 1x network. At 1713, the MME releases the connection and sends a connection release message to the wireless device.

At 1714, the wireless device switches to 1x traffic channel which is allocated by the 1x BTS. At 1715, the 1x MSC notifies the MME through the IWS that the wireless device is connecting to 1x network. At 1716. the MME acknowledges the notification to the MSC over a S102 interface.

Figure 18:
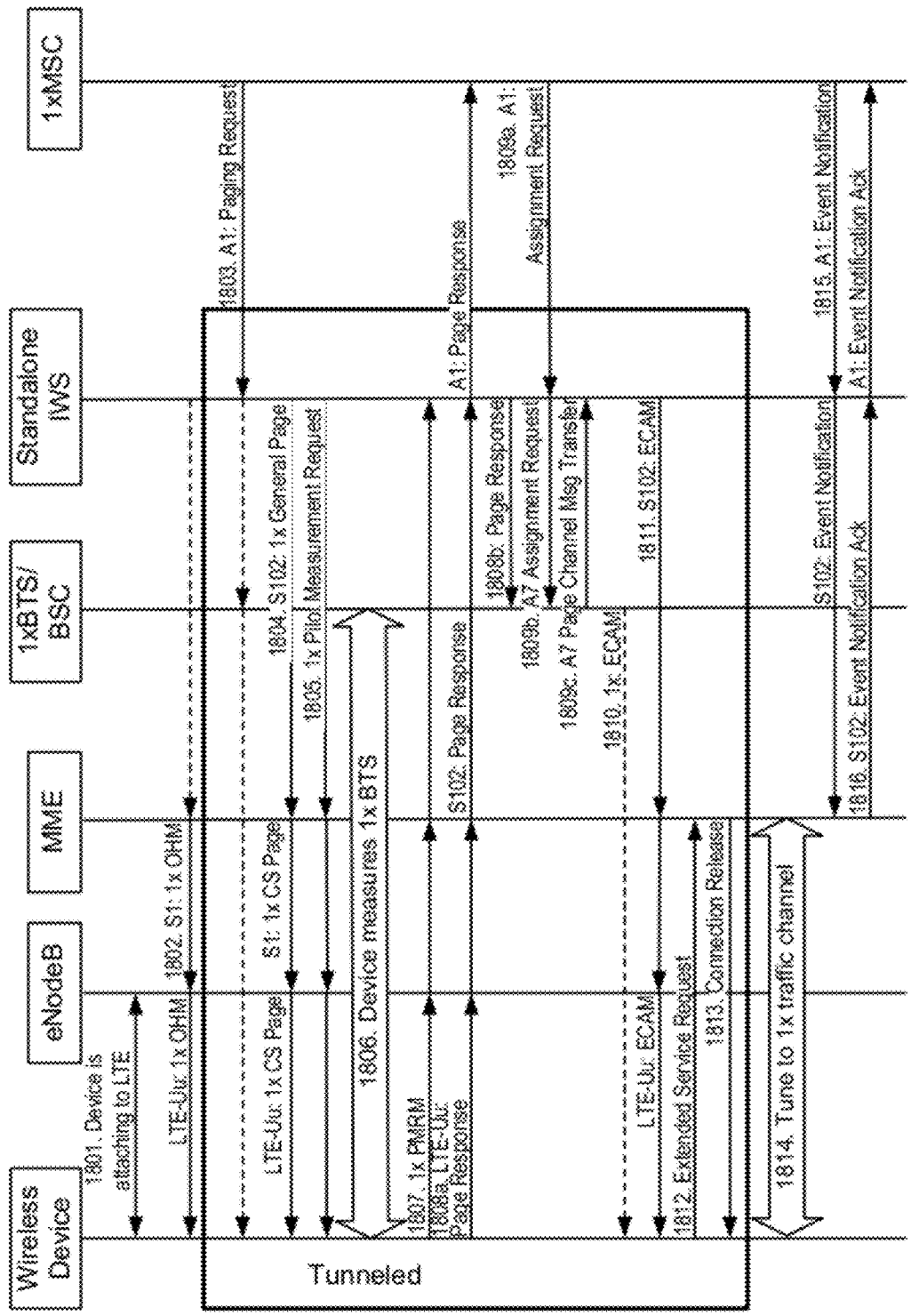
FIG. 18 shows another example of a 1x Circuit Switch Fall Back call flow for a mobile terminated call.

FIG. 18 shows another example of a 1x CSFB call flow for a mobile terminated call. This example uses a standalone IWS. At 1801, a wireless device completed registration with a 1x network and attaches to a LTE network. At 1802, the MME broadcasts 1x system parameters in SIB-8. The wireless device receives and stores the 1x system parameters. At 1803, the 1x MSC sends a Page Request to the IWS.

At 1804, the IWS sends the 1x circuit switch Page through a LTE tunnel via the MME and the eNodeB to the wireless device. The IWS can send a 1x circuit switch page through the 1x BTS for the case that the wireless device is in a LTE-Idle state. At 1805, the IWS can send a Pilot Measurement Request to the wireless device over the tunnel. At 1806, the wireless device measures 1x BTS pilot signal in Measurement Gap. At 1807, the wireless device reports measurement result in a PMRM to the IWS over the LTE tunnel. At 1808a, the wireless device sends a 1x page response message to the IWS over the LTE tunnel and to the MSC.

At 1808b, the IWS can send a page response message to the 1xBTS/BSC. In some implementations, at 1808b, the IWS sends a message that includes the PMRM information. At

1809*a*, the MSC sends an Assignment Request to the IWS. At 1809*b*, the IWS can forward the Assignment Request to the 1xBTS. At 1809*c*, the 1xBTS/BSC can send an A7-Paging Channel Transfer Message to the IWS. In some implementations, the BSC constructs an ECAM and sends the ECAM over an A7-Paging Channel Transfer Message to the IWS. At 1810, the BSC sends an ECAM to the 1xBTS to allocate radio resource for a traffic channel on the BTS side to reduce the call setup time. At 1811, the IWS sends an ECAM to the wireless device over the tunnel to request to setup a traffic channel. In some implementations, the IWS sends a 1x CSFB Command to trigger 1x SAP switch over. In some implementations, the wireless device automatically triggers the switch over by itself. Based on receiving the ECAM, at 1812, the wireless device sends an Extended Service Request message to the MME to indicate to switch to the CDMA2000 1x network. At 1813, the MME releases the connection and sends a connection release message to the wireless device.

At 1814, the wireless device switches to 1x traffic channel which is allocated by the 1x BTS. At 1815, the 1x MSC notifies the MME through the IWS that the wireless device is connecting to 1x network. At 1816, the MME acknowledges the notification to the MSC over a S102 interface.

Figure 19:
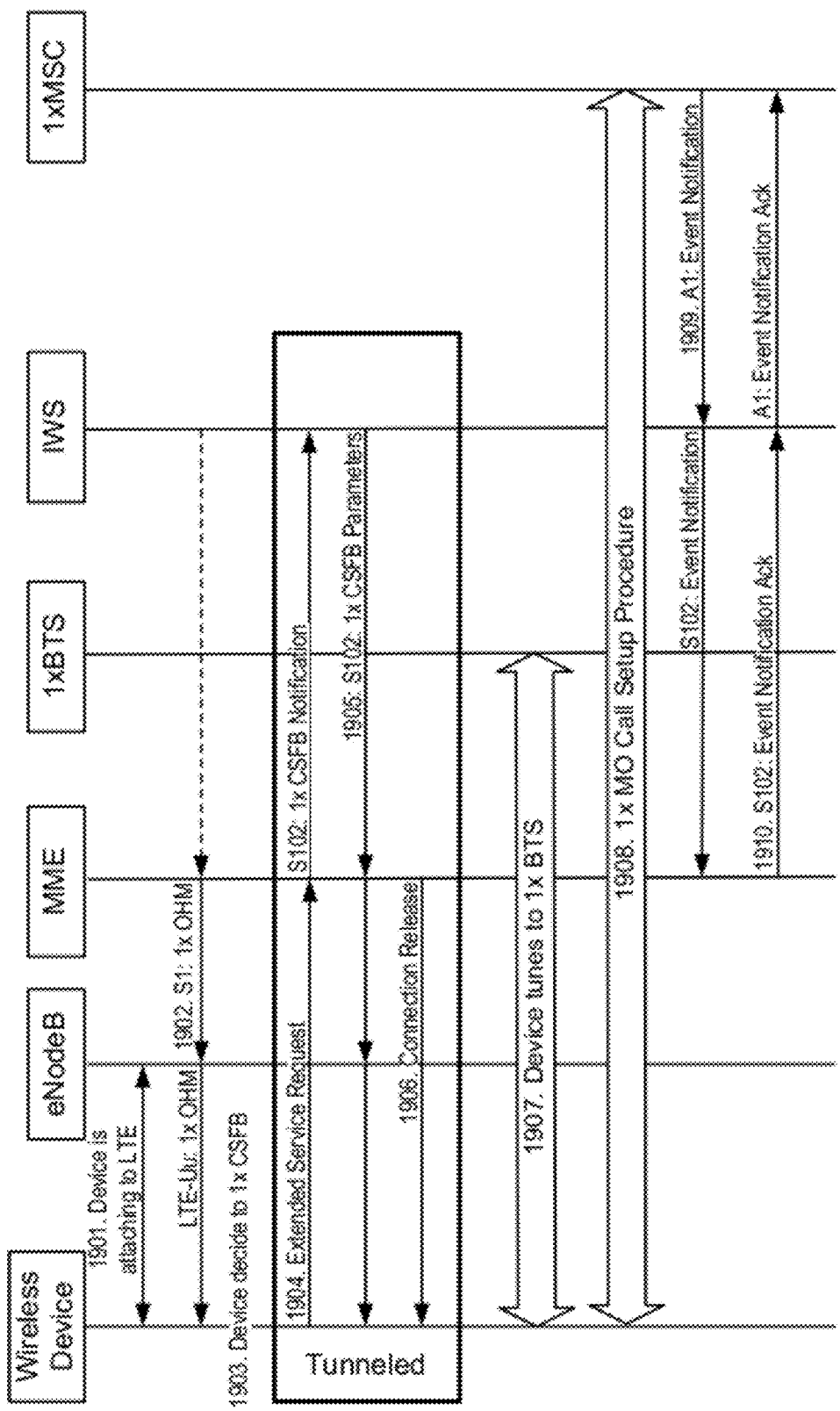
FIG. 19 shows another example of a 1x Circuit Switch Fall Back mobile originated call flow.

FIG. 19 shows another example of a 1x CSFB mobile originated call flow. This example is associated with a BSC-Lite IWS implementation. At 1901, a wireless device has completed registration with 1x network and attaches to LTE network. At 1902, the MME broadcasts 1x System Parameters in SIB8. The wireless device receives and stores them. At 1903, the wireless device decides to make 1x CSFB for origination. At 1904, the wireless device sends an Extended Service Request message to MME to indicate to switch back to cdma2000 1x network. The MME can send a notification to the IWS. At 1905, the IWS can send 1x CSFB parameters, via the eNodeB, to the wireless device over the tunnel to assist the wireless device to acquire a 1x signal. At 1906, the MME releases and redirects the wireless device to CDMA2000 1x network. At 1907, the wireless device uses the stored 1x system information to tune its radio to 1x frequency. At 1908, the wireless device and 1x BTS perform a mobile originated call procedure to setup a traffic channel. At 1909, the 1x MSC notifies MME through IWS that the wireless device is connecting to CDMA2000 1x network. At 1910, the MME acknowledges the notification.

Figure 20:
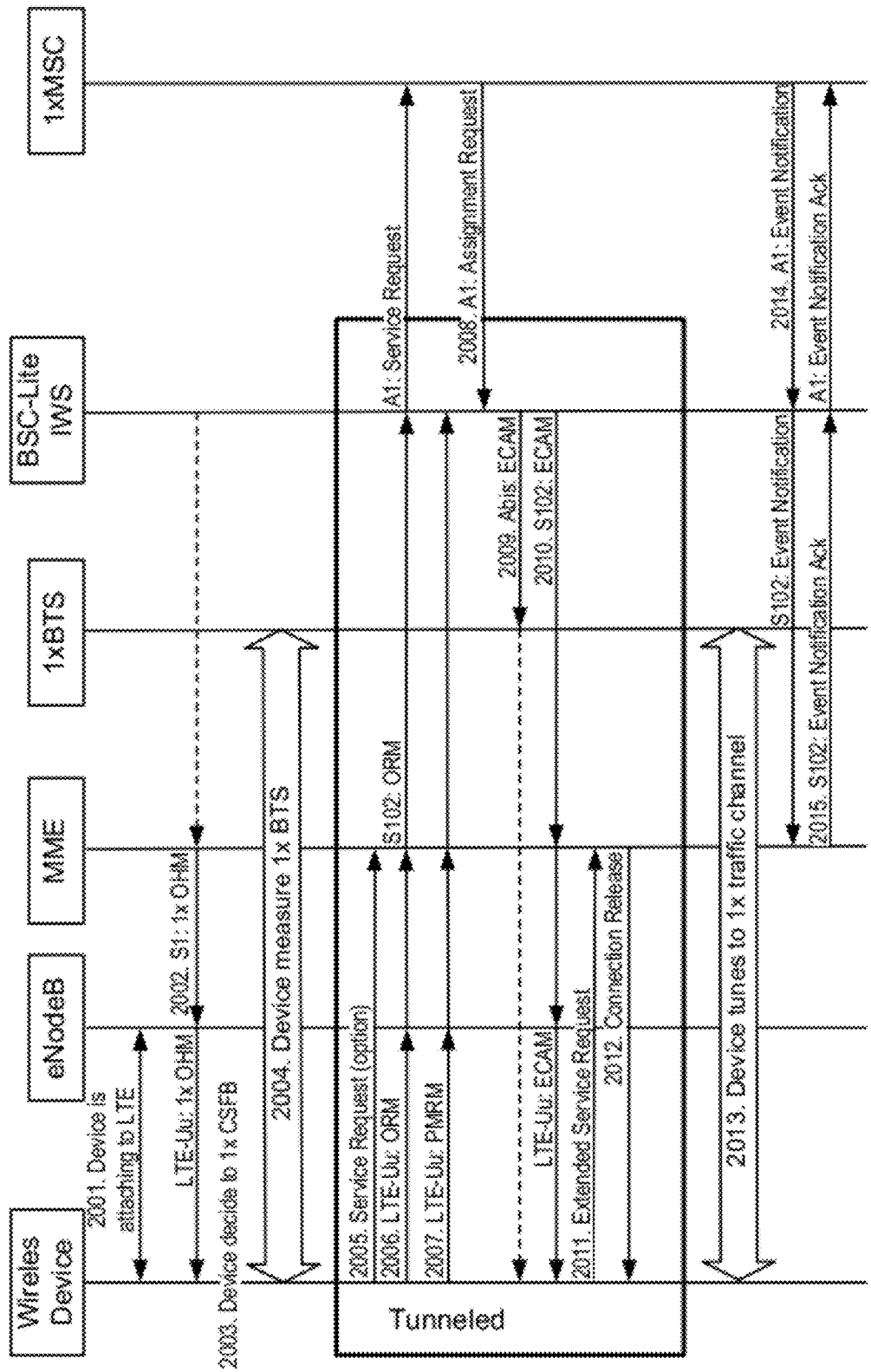
FIG. 20 shows another example of a 1x Circuit Switch Fall Back mobile originated call flow.

FIG. 20 shows another example of a 1x CSFB mobile originated call flow. This example is associated with a BSC-Lite IWS. This call flow optimizes 1x CSFB mobile originated calls via tunneling some 1x messages over LTE to reduce the call setup latency. At 2001, a wireless device has completed registration with 1x network and attaches to LTE network. At 2002, the MME broadcasts 1x System Parameters in SIB8. The wireless device receives and stores the system parameters. At 2003, the wireless device decides to CSFB to CDMA2000 1x network for MO call or sends a SMS over 1x traffic channel. At 2004, the wireless device measures a 1x BS pilot signal in a measurement gap.

At 2005, the wireless device can send a Service Request if it is in the Idle State. At 2006, the wireless device sends the 1x Origination Request Message (ORM) to the IWS over the tunnel and to the MSC. At 2007, the wireless device reports measurement results in a PMRM to the IWS over the tunnel. At 2008, the MSC sends an Assignment Request to IWS. At 2009, the IWS sends an ECAM message to 1x BTS to allocate radio resource and setup traffic channel on BTS side for optimization of call setup time. At 2010, the IWS sends an ECAM to the wireless device over the tunnel to request to setup a traffic channel. In some implementations, the IWS sends a 1x CSFB Command to trigger 1x SAP switch over. In some implementations, the wireless device automatically determine the switch over by itself. At 2011, based on receiving an ECAM message, the wireless device sends an Extended Service Request message to the MME to indicate a switch to the CDMA2000 1x network. At 2012, the MME sends a connection release message to release the connection.

At 2013, the wireless device switches to a 1x traffic channel. At 2014, the 1x MSC notifies the MME through IWS that the wireless device is connecting to CDMA2000 1x network. At 2015, the MME acknowledges the notification.

Figure 21:
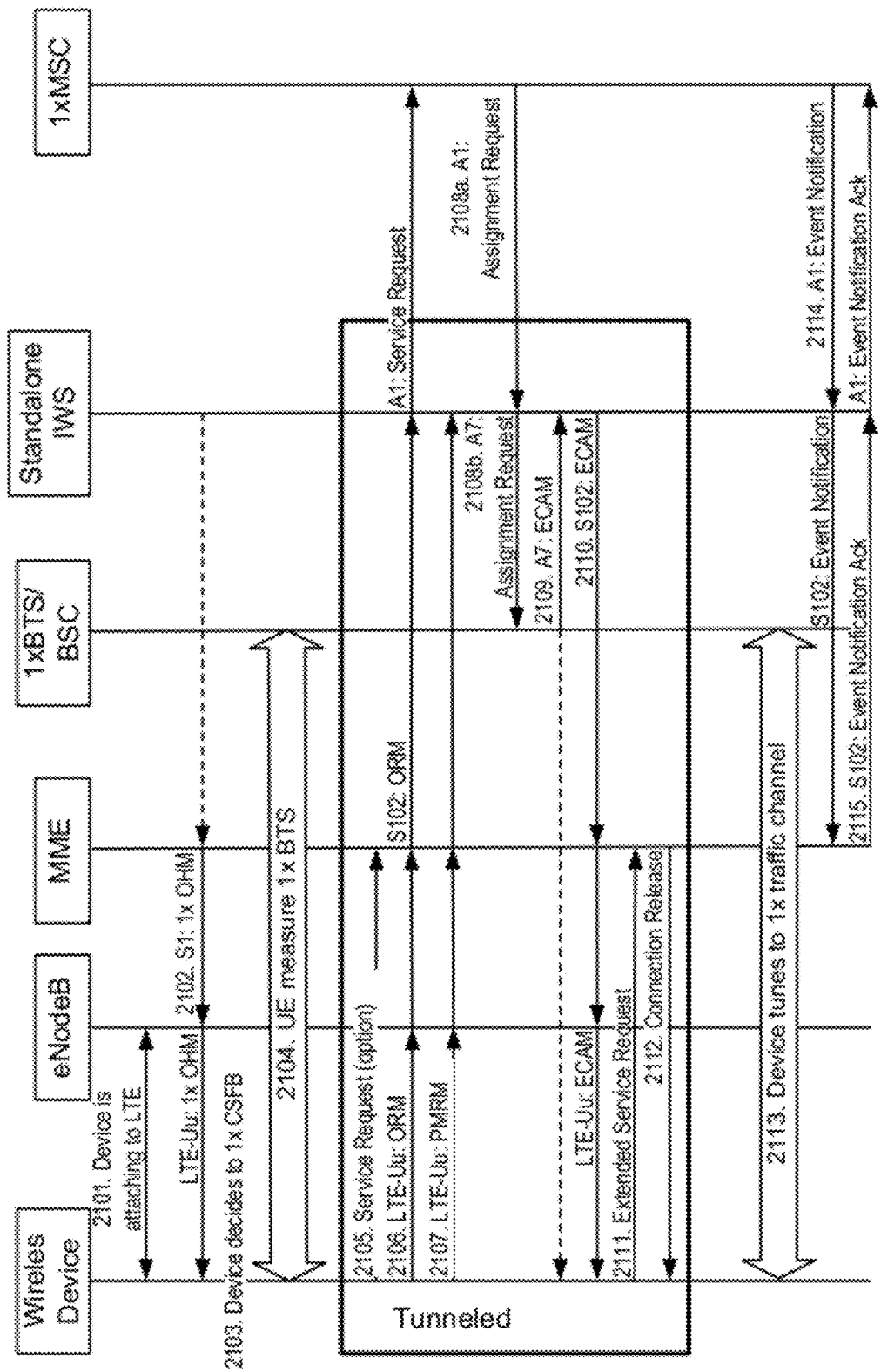
FIG. 21 shows an example of a 1x Circuit Switch Fall Back mobile originated call flow.

FIG. 21 shows an example of a 1x CSFB mobile originated call flow. This example is associated with a standalone IWS. This call flow optimizes 1x CSFB mobile originated calls via tunneling some 1x messages over LTE to reduce the call setup latency. At 2101, a wireless device has completed registration with 1x network and attaches to LTE network. At 2102, the MME broadcasts 1x System Parameters in SIB8. The wireless device receives and stores the system parameters. At 2103, the wireless device decides to CSFB to CDMA2000 1x network for MO call or sends a SMS over 1x traffic channel. At 2104, the wireless device measures a 1x BS pilot signal in a measurement gap.

At 2105, the wireless device can send a Service Request if it is in the Idle State. At 2106, the wireless device sends the 1x Origination Request Message (ORM) to the IWS over the tunnel and to the MSC. At 2107, the wireless device reports measurement results in a PMRM to the IWS over the tunnel. At 2108*a*, the MSC sends an assignment request to the IWS. At 2108*b*, the IWS can forward the assignment request to the 1x BSC.

At 2109, based on the assignment request the 1x BSC constructs an ECAM and sends the ECAM to the IWS over an A7 interface. The 1x BSC/BTS can setup traffic channel on BTS side. At 2110, based on receiving the ECAM, the IWS can forward the ECAM to the wireless device over the tunnel to request to setup a traffic channel. In some implementations, the IWS sends a 1x CSFB Command to trigger 1x SAP switch over. In some implementations, the wireless device automatically determine the switch over by itself.

At 2111, based on receiving an ECAM message, the wireless device sends an Extended Service Request message to the MME to indicate a switch to the CDMA2000 1x network. At 2112, the MME sends a connection release message to release the connection.

At 2113, the wireless device switches to a 1x traffic channel. At 2114, the 1x MSC notifies the MME through IWS that the wireless device is connecting to CDMA2000 1x network. At 2115, the MME acknowledges the notification.

Figure 22:
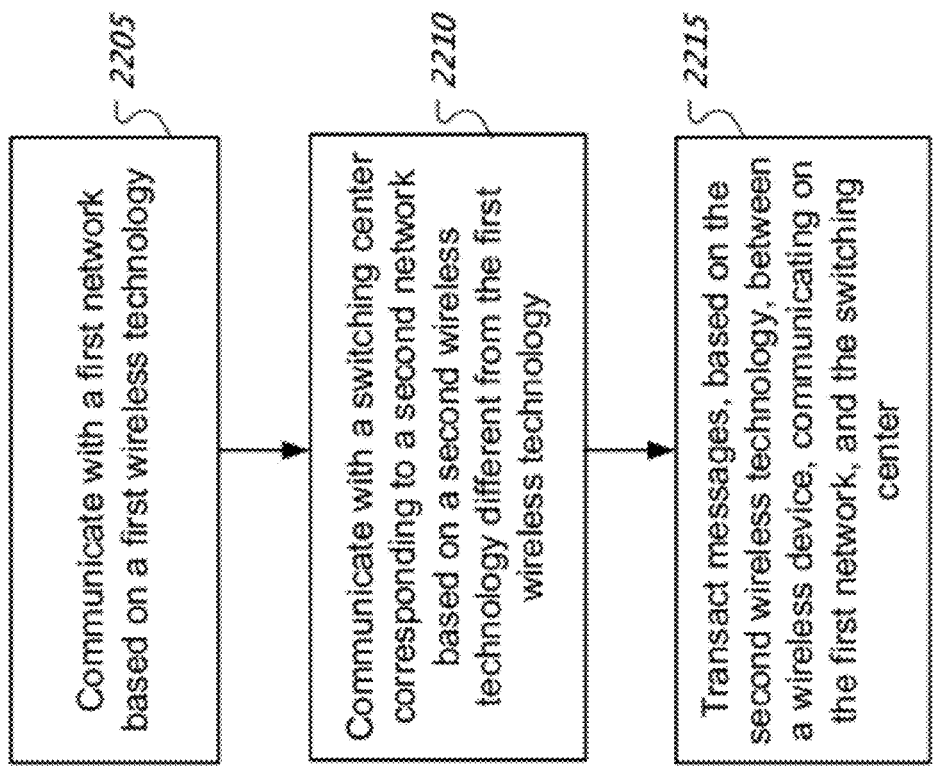
FIG. 22 shows an example of a communication process.

FIG. 22 shows an example of a communication process. A communication process can include communicating with a first network based on a first wireless technology (2205). A communication process can include communicating with a switching center corresponding to a second network based on a second wireless technology different from the first wireless technology (2210). A communication process can include transacting messages, based on the second wireless technology, between a wireless device, communicating on the first network, and the switching center (2215).

As discussed above, newer wireless communication networks, e.g., fourth generation (4G) communication networks, are based on OFDM and MIMO technologies and with am emphasis on data services. Since the high spectrum efficiency of CDMA technology in voice services, CDMA2000 1x network could still be used to provide the voice services even after 4G network is widely deployed and used in a couple of year later. Therefore it will have a long period that CDMA2000 1x circuit switching networks co-exists with 4G LTE networks.

In order to provide smooth interworking for co-existing of multi-technology networks, 1x Circuit Switch Fall Back (CSFB) can be used in the operator's network which has not deployed IMS for VoIP services. CSFB could provide a way to keep voice and data network separately. When a wireless device is connecting to LTE network for the data service, the CDMA2000 1x network (MSC) may page the mobile station for voice service (MT call), or the user of the wireless device may want to originate a voice call (MO call). Due to a single radio shared by the multiple technologies, such as CDMA2000 and LTE, the wireless device has to tune its radio to CDMA2000 1x frequency from LTE frequency after the wireless device has to fall back to CDMA2000 1x network to perform the voice service. During 1x CSFB, the data service over the LTE network would be suspended.

The following sections describe techniques, apparatuses, and systems for interworking between different wireless technologies associated with interworking Circuit Service Fall Back (CSFB) and enhanced CSFB (eCSFB). A CSFB or eCSFB mechanism can bridge two or more different wireless technologies to allow communications between the two or more technologies.

Figure 23:
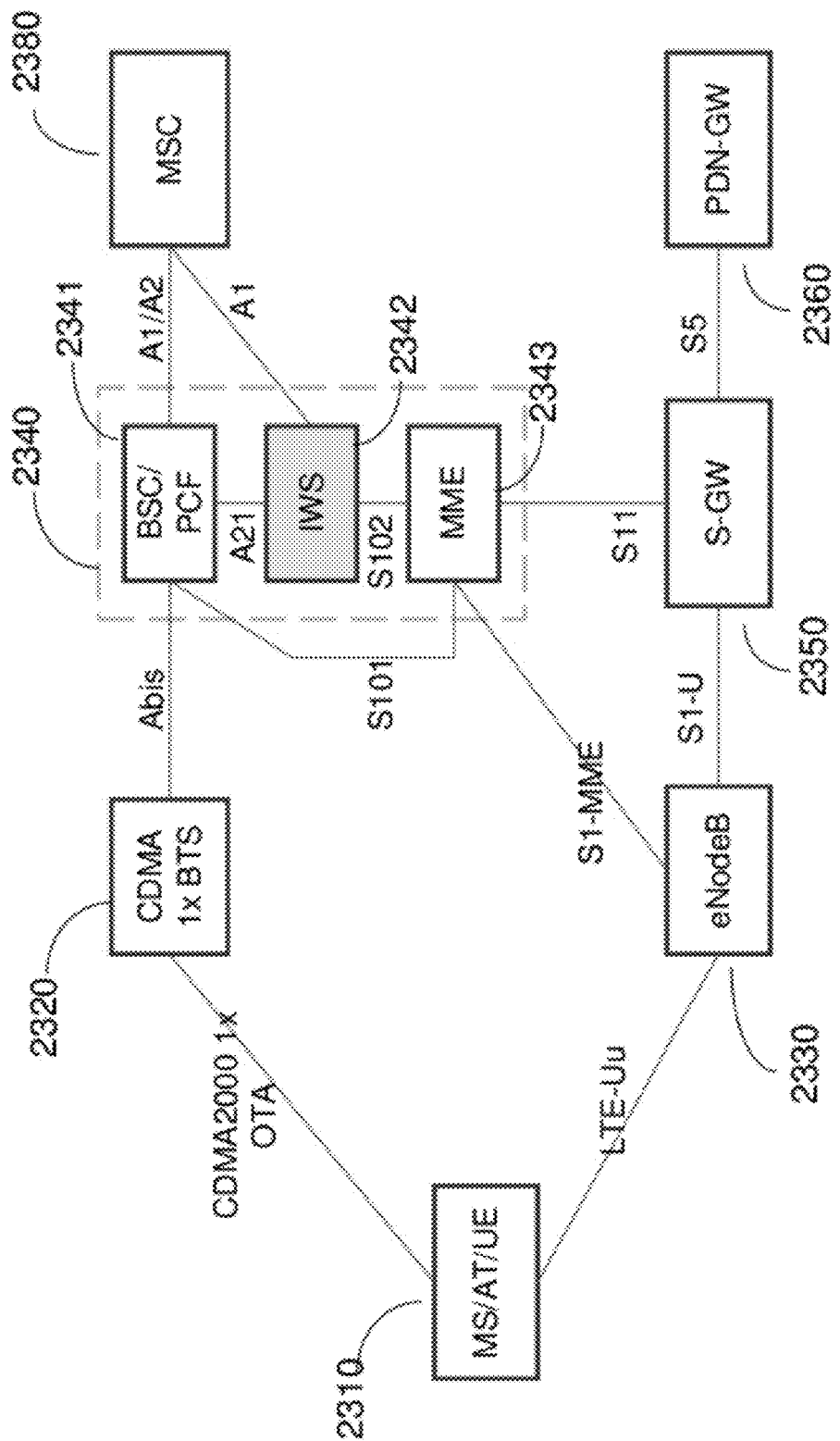
FIG. 23 shows an example of an interworking architecture for CSFB and enhanced CSFB (eCSFB).

FIG. 23 shows an exemplary interworking architecture for CSFB and eCSFB. This example includes several modules. A multi-mode mobile station/access terminal/UE 2310 is a wireless device to connect to different wireless technology networks. CDMA2000 base stations 2320 containing CDMA2000 1x radio provides the voice and data services over the air connection to wireless device 2310 using CDMA2000 1x technology. eNodeB 2330 is a wireless base station in LTE network to provide the over the air (LTE-Uu) connection to the wireless device 2310. The node 2320 and 2330 are functional entities and may be implemented within a single shelf or in different physical nodes. The example also includes a network control node 2340 which is a function entity, containing BSC/PCF 2341, IWS 2342 and MME 2343. The BSC/PCF 2341 is a base station controller for control of CDMA2000 base station 2320 over the Abis interface. The MME 2343 is a network entity used to control the eNodeB 2330 over S1-MME interface. An interworking service (IWS) 2342 is a network functional entity to support different wireless technologies interworking. IWS 2342 is connected to BSC/PCF 2341 over A21 interface and connected to MME 2343 over S102 interface. An IWS can encapsulate and transact CDMA2000 1x messages between a wireless device and a mobile switching center 2380 over A1 interface.

In addition, the example in FIG. 23 includes a Serving Gateway (S-GW) 2350 which is a network node to provide packet routing function in LTE network. The gateway 2350 connects to eNodeB 2330 over S1-U interface, and connects to MME over S11 interface. A Mobile Switching Center 2380 is a network node and is included in the example in FIG. 23 to provide mobile voice services in the circuit switching network. A network node 2360 is provided as the packet data network gateway (PDN-GW) in LTE network. The node connects to S-GW 2350 over S5 interface.

The interworking services architecture provides a generic 1x CSFB framework across different wireless technologies. When a wireless device attaches to a LTE network, it can communicate with CDMA2000 1x MSC through IWS in the interworking CSFB architecture. IWS will bridge the LTE and CDMA2000 1x network, encapsulate and transact CDMA2000 1x messages between the wireless device 2310 and MSC 2380.

The cell ID is used to identify the wireless cell by the Core network. The legacy MSC 2380 tracks the location of a wireless device via Location Area Code (LAC), which is derived from the cell (Cell ID) where the wireless device registers. When a wireless device 2310 sends a Registration message over CDMA2000 1x OTA link, the CDMA2000 BTS 2320 relays it to BSC 2341. BSC 2341 then finds out the Cell ID information associated with the link of Abis, and uses it to build up a Location Updating Message over the A1 interface for MSC. Based on the received Location Updating Message, MSC updates the location information of the wireless device in VLR and/or HLR.

In CDMA2000 1x and LTE Interworking scenario, the Cell ID is used for IWS to build A1 messages for MSC. The Cell ID in the interworking scenario can be used to perform various functions. For example, one function is to handle the messages related to the non fallback related action such as processing 1x Registration message or SMS. IWS needs to build an A1 message such as Location Updating Message using Cell ID associated to IWS so that the MSC would know that the wireless device attaches to LTE network and will page it through IWS using the LAC associated to IWS. Since this function is similar to legacy BSC function, IWS may get this Cell ID information through a proper configuration.

Another exemplary function of Cell ID in the interworking CSFB is to handle the fallback related actions such as processing 1x Page Response or Handoff Required message. IWS needs to construct A1 messages using Cell ID associated to 1x Cell(s) as the target cells so that it would be possible for the MSC to setup traffic channel(s) on the proper CDMA2000 1x cell(s) when the wireless device falls back to CDMA2000 1x network. In this case, IWS needs to be provided Cell IDs information related to CDMA2000 1x cells.

Consequently, the IWS needs two kinds of Cell IDs in CDMA2000 1x and LTE interworking CSFB case: IWS associated Cell ID and CDMA2000 1x associated CellIDs to construct A1 messages for MSC. The existing interworking specification has following issues about obtaining and construction of cell ID.

A) The current A21-1x air interface signaling message has only one Cell ID field. If it is used to associate to IWS Cell ID, there is no other field to include CDMA2000 1x related Cell IDs. Vice versa.

B) If the wireless device moves from one place to another within LTE network, it requires MME to track 1x cell information for each tunneled 1x message. In other words, LTE does not only provide the tunneling for the CDMA2000 1x message but also needs to track the CDMA2000 1x cells which the wireless device might fallback to. This will make MME implementation more complicated than what is supposed to, and increate the interworking deployment complexity.

C) The wireless device needs to monitor the radio condition of CDMA2000 1x network and report to MME frequently. Failing to do this, it would be difficult for MME to know which CDMA2000 1x cell is associated with exactly and fill the reference cell ID field in A21-1x message. However, in eCSFB call flow of TS23.272, the 1x cell measurement report is optional. If the wireless device could not provide exact 1x cell information which it would like to fallback to, MSC may need to setup traffic channels in multiple neighboring CDMA2000 1x cells of eNodeB that the wireless device attaches to. This would cause unnecessary radio resource wasting and high call setup failure rate.

D) IWS may be connected to a legacy MSC. From a MSC point of view, there is no difference between A1 interface from a BSC and A1 interface from IWS. Therefore legacy MSC 180 may not be able to distinguish the A1 messages from BSC or IWS; and does not know whether the wireless device attaches to LTE or CDMA2000 1x network.

To address above and other issues related to Cell ID in the interworking CSFB and eCSFB, implementations of a number of mechanisms for the registration, mobile originating call and mobile termination call procedures are provided below.

In one implementation of the CSFB interworking registration, for example, a CSFB capable wireless device sends a CDMA2000 1x Registration message with CDMA2000 1x cell information including 1x Cell IDs and radio environment measurement. When receiving a Registration message from a wireless device over LTE tunnel, an IWS connecting to a legacy MSC shall transmit multiple Location Update Messages using CDMA2000 1x Cell IDs and IWS Cell ID information so that legacy MSC can keep record of wireless device location mapping to both LTE network through IWS and CDMA2000 1x cells.

For CSFB MT call, when a legacy MSC pages a wireless device attaching to LTE network, the legacy MSC uses a multiple paging algorithm to send multiple Page Request Messages to the IWS associated with IWS Cell ID (LAC) and BSCs in the paging zones associated with CDMA2000 1x Cell IDs. After receiving a Page Request message over LTE tunnel, the wireless device shall fall back to CDMA2000 1x network to transmit a Page Response Message to 1x MSC. The MSC shall send an Assignment Request to the BSC which receives the Page Response message from the wireless device. Then BSC shall send an ECAM message for the traffic channel setup over the CDMA2000 1x cell which the Page Response message is received.

For eCSFB interworking registration, an eCSFB capable wireless device sends a CDMA2000 1x Registration message including a Cell ID associated to IWS only. When receiving a Registration message from an eCSBF capable wireless device over LTE tunnel, an IWS connecting to a legacy MSC could transmit single Location Update Messages using IWS Cell ID for MSC to keep record of wireless device location mapping to LTE network through IWS.

For the interworking eCSFB MO call, before sending a CDMA2000 1x Origination message over the LTE tunnel, the eCSFB capable wireless device needs to tune-away to CDMA2000 1x network first and measure pilot signal strength of neighboring CDMA2000 1x cells. Then the wireless device returns to LTE network and transmits CDMA2000 1x Origination message with CDMA2000 1x cell information over LTE tunnel, including CDMA2000 1x Cell IDs and radio environment measurement. When the IWS receives the Origination message with CDMA2000 1x cell information, it can send Service Request message to 1x MSC using IWS Cell ID so that MSC would respond back to the IWS only. When IWS receives Assignment Request message, it may not send an ECAM to the wireless device over the LTE tunnel. Instead, IWS creates an Assignment Complete message back to 1x MSC. Meanwhile, IWS will use CDMA2000 1x cell information as target cells to construct a CDMA2000 1x Handoff Required message for MSC. Based on received CDMA2000 1x cell information, MSC sends a Handoff Request Message to CDMA2000 1x BS to setup traffic channel. At the same time, MSC sends a Handoff Command to IWS. IWS then builds up a UHDM message with CDMA2000 1x cell information for the wireless device and sends it over LTE tunnel. Upon receiving the UHDM, the eCSFB capable wireless device will release LTE connection and fallback to CDMA2000 1x network. The wireless device and CDMA2000 1x network will follow exact CDMA2000 1x call flow procedure to establish traffic channels.

For the interworking eCSFB MT call, MSC can page the wireless device attaching to LTE network and registered with CDMA2000 1x network over LTE tunnel. After receiving the Paging message, the eCSFB capable wireless device needs to tunes-away to CDMA2000 1x network and measure pilot signal strength of neighboring CDMA2000 1x cells. Then the wireless device returns to LTE network and transmits CDMA2000 1x Page Response message with CDMA2000 1x cell information over LTE tunnel, including CDMA2000 1x Cell IDs and radio environment measurement. When IWS receives a Page Response message with CDMA2000 1x cell information, it relays the message to 1x MSC using IWS Cell ID so that MSC would respond back to the IWS only. When IWS receives Assignment Request message from MSC, it may not send an ECAM to the wireless device over the LTE tunnel, Instead, it creates an Assignment Complete message back to 1x MSC. Meanwhile, IWS will use CDMA2000 1x cell information as target cells to construct a CDMA2000 1x Handoff Required message for MSC. Based on received CDMA2000 1x cell information, MSC sends Handoff Request Message to CDMA2000 1x BS to setup traffic channel. Meanwhile MSC sends Handoff Command to IWS to trigger the wireless device falling back to CDMA2000 1x network. Upon receiving Handoff Command, IWS builds up a UHDM message for the wireless device and sends it over LTE tunnel. The eCSFB capable wireless device will release LTE connection and fallback to CDMA2000 1x network when receiving the UHDM. The wireless device and CDMA2000 1x network will follow exact CDMA2000 1x call flow procedure to establish traffic channels.

In order to provide a further simplified and efficient way for the wireless device to include CDMS2000 1x cell information, new fields of CDMA2000 1x cell information are added into the existing GCSNA interworking protocol. In this way, the wireless device could include the CDMA2000 1x cell information directly with the CDMA2000 message such as Registration, Origination or Page Response message. Unlike existing specification, the CDMA2000 1x cell information can go with the CDMA2000 1x messages directly to IWS over the LTE tunnel without being processed by MME. This will make interworking CSFB more decoupling and independent, and MME design simplified.

FIG. 24 shows an example of enhanced GCSNA protocol including the new fields of CDMA2000 cell information.

CellIDIncl field is used to indicate whether the CellID is included in GCSNA. If the CellID(s) field is included in this message, the wireless device shall set this field to '1'. Otherwise, the wireless device shall set this field to '0'. IWS shall always set this field to '0'.

NumCellIDs field is used to indicate the number of CellIDs to be included in GCSNA. If the CellIDIncl field is set to '1', the wireless device shall include and set this field to the number of cell IDs. Otherwise the sender shall omit this field.

CellID field is to identify the CDMA2000 1x cell. It could be expressed in the Pilot PN or Pilot PN Phase. If NumCellIDs is not 0, the wireless device shall set this field to the CDMA2000 1x cell IDs which are received from SIB 8 of attached eNodeB, or are measured. Otherwise the mobile station shall omit this field.

RadioMeasurementIncluded field is used to indicate whether the radio measurement result is included in GCSNA. If NumCellIDs is not 0, and if the CDMA2000 1x pilot strength measurement is included, the wireless device shall set this field to 1. Otherwise if the CDMA2000 1x pilot strength measurement is not included, the wireless device shall set this field to 0.

PilotStrength field is used for the radio measurement. If the RadioMeasurementIncluded field is set to 1, the wireless device shall include CDMA2000 1x pilot strength measurement in this field. Otherwise, the wireless device shall omit this field.

The wireless device could use different approaches to acquire CDMA2000 1x cell information. In the LTE network, CDMA2000 1x cells' information is broadcast in eNodeB SIB-8. Therefore it is available to all the wireless devices attaching to LTE network.

To refine the CDMA2000 1x cell information, the wireless device attaching to LTE network may tune-away from LTE and measure the pilots of neighboring cells of CDMA2000 1x network. Based on the measurement in CDMA2000 1x network, the wireless device may build up a list of CDMA2000 1x cell information and transmit them to IWS directly when needed.

Figure 25:
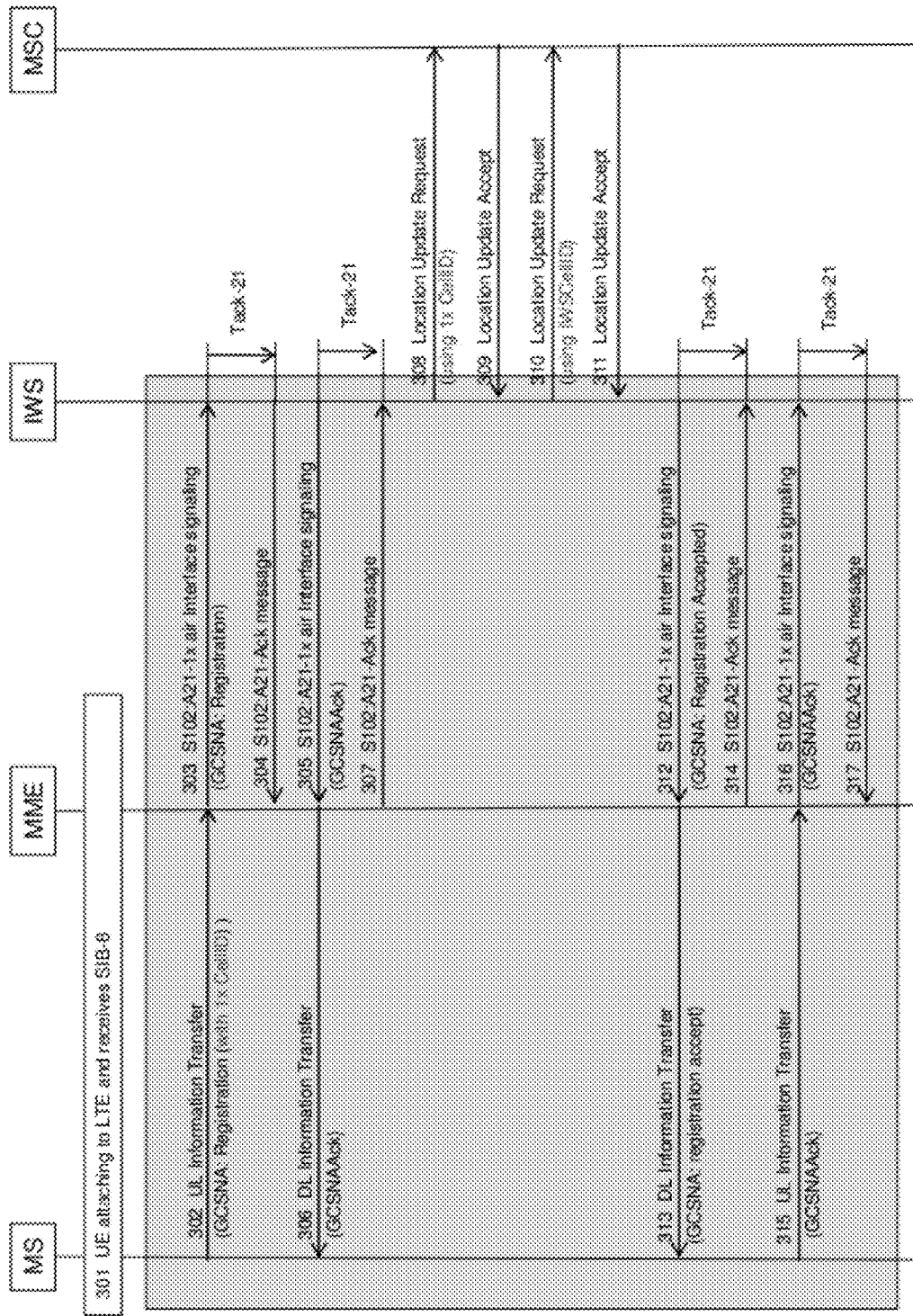
FIG. 25 shows an example of an interworking registration procedure for 1x CSFB.

FIG. 25 shows an example of interworking registration procedure for 1x CSFB.

Step 301. The wireless device attaches to LTE network and receives the CDMA2000 1x neighboring cells information from SIB-8 broadcast by eNodeB.

Step 302. The wireless device transmits the CDMA2000 1x Registration message with the 1x CellID information encapsulated in LTE UL Information Transfer message to MME.

Step 303. Upon receiving the encapsulated Registration message, MME passes it to IWS in A21-1x Interface signaling message.

Step 304. IWS responds A21-Ack in Tack-21 seconds to confirm receiving A21-1x air interface signaling message.

Step 305. IWS responds with GCSNAAck capsulated in A21-1x air interface signaling message to MME to indicate the receipt of GCSNA message.

Step 306. MME relays GCSNAAck over eNodeB to the wireless device.

Step 307. Meanwhile, MME confirms with IWS via A21-Ack message that A21-1x air interface signaling message is received.

Step 308. IWS builds up a Location Updating Message using received 1x CellID information and sends to MSC.

Step 309. MSC responds to IWS with Location Update Accept message.

Step 310. IWS may get IWS Cell ID information from the configuration, or GCSNA message, builds up a Location Updating Message using IWS CellID information and sends to MSC.

Step 311. MSC responds to IWS with Location Update Accept message.

Step 312. After receiving the confirmation from MSC, IWS builds up a CDMA2000 1x Registration Accepted message and sends to MME via A21-1x air interface signaling message.

Step 313. MME relays the Registration Accepted message in DL Information Transfer message to the wireless device.

Step 314. MME confirms with IWS that the A21-1x air interface signaling message is received in Tack-21 seconds.

Step 315. The wireless device transmits GCSNAAck encapsulated in UL Information Transfer message to MME upon receiving the CDMA2000 1x Registration Accepted message.

Step 316. MME relays the GCSNAAck message in A21-1x air interface signaling message to IWS.

Step 317. IWS confirms with MME that the A21-1x air interface signaling message is received within Tack-21 seconds.

Figure 26:
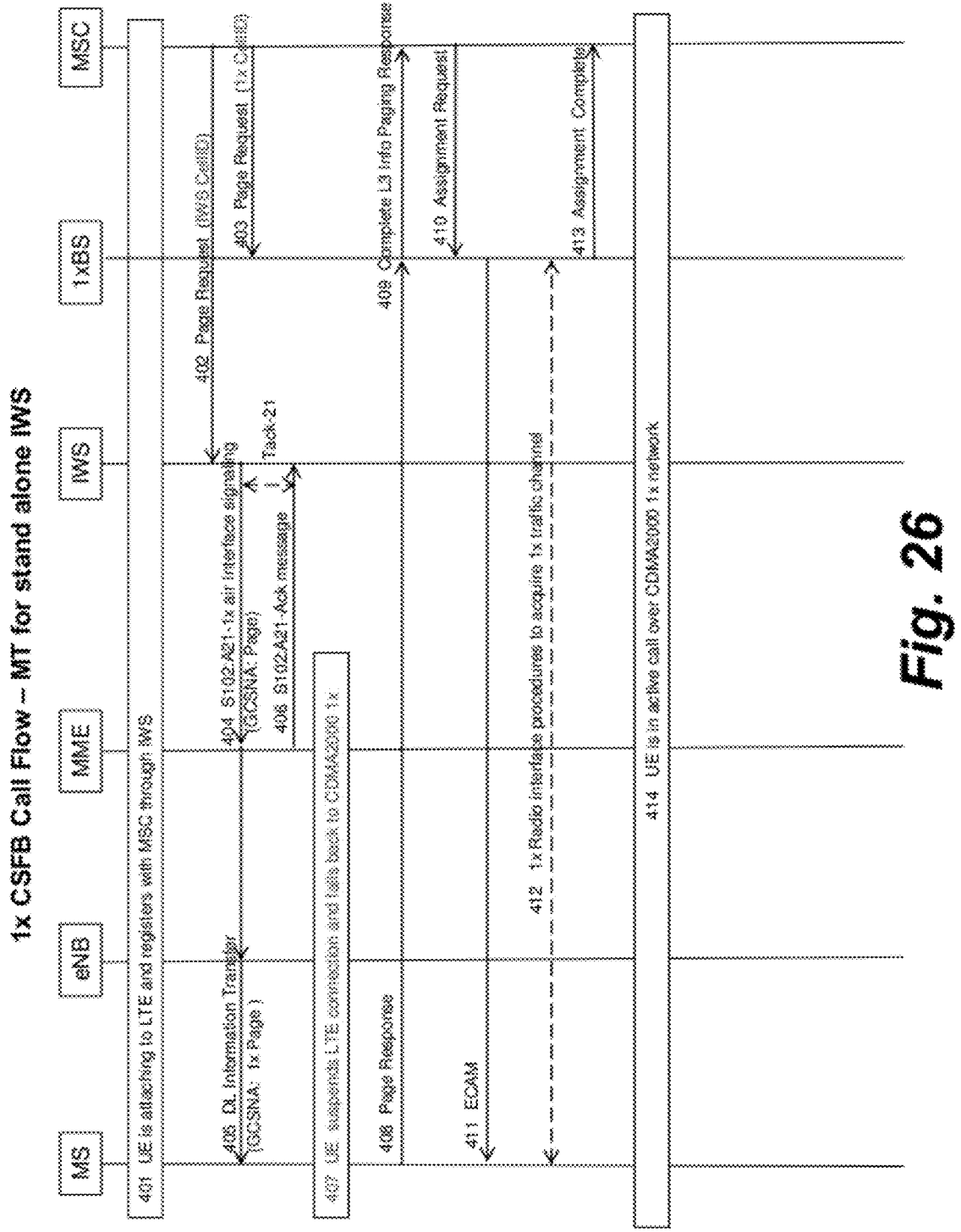
FIG. 26 shows an example of an interworking MT call flow for CSFB.

FIG. 26 shows an example of interworking MT call flow for CSFB.

Step 401. The wireless device attaches to LTE network and registers with CDMA2000 1x MSC through IWS indicating that the wireless device is located in LTE network.

Step 402. The CDMA2000 1x MSC identifies the location of the wireless device through the registration information, and sends a Page Request Message using IWS CellID (or LAC).

Step 403. Meanwhile, MSC sends the same Page Request Message to 1x BS identified by LAC associated to CDMA2000 1x cells in the Registration message. In this way, 1x BS protocol processor could be able to wait for Page Response Message from the wireless device. Otherwise, 1x BS will discard the received Page Response Message sent by the wireless device after it falls back to CDMA2000 1x network.

Step 404. IWS encapsulates the Page message in GCSNA and sends to MME in A21-1x air interface signaling message.

Step 405. MME forwards the GCSNA message in DL Information Transfer message over LTE air link to the wireless device.

Step 406. MME responds with A21-Ack message to IWS to confirm it receives the A21-1x air interface signaling message.

Step 407. Upon receiving the Page message over LTE tunnel, the wireless device initiates the disconnection with LTE network and falls back to CDMA2000 1x network.

Step 408. The wireless device sends the Page Response message to 1x BS over CDMA2000 1x air interface.

Step 409. 1x BS passes the Page Response message to MSC.

Step 410. MSC then sends Assignment Request to 1x BS to request the traffic channel setup for the wireless device.

Step 411. 1x BS builds up an Extended Traffic Channel Assignment Message (ECAM) and sends to the wireless device over CDMA2000 1x air interface.

Step 412. Once receiving the ECAM, the wireless device tunes to the CDMA2000 traffic channel and establish the communication with 1x BS.

Step 413. After the traffic channel is established, 1x BS sends Assignment Complete message to MSC.

Figure 27:
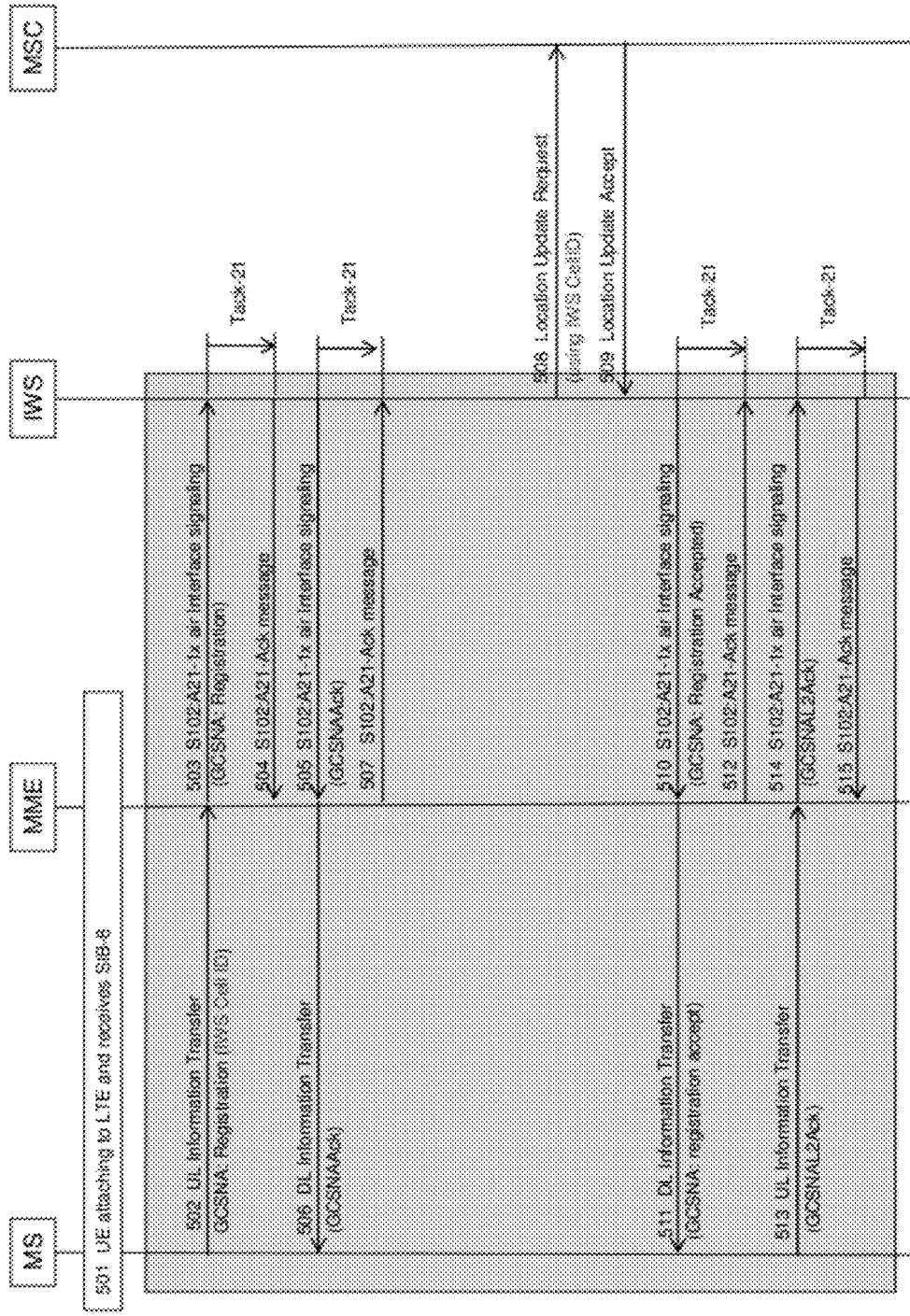
FIG. 27 shows an example of an interworking registration for eCSFB.

FIG. 27 shows an example of interworking registration for eCSFB.

Step 501. The wireless device attaches to LTE network and receives the CDMA2000 1x neighboring cells information from SIB-8 broadcast by eNodeB.

Step 502. The wireless device transmits the CDMA2000 1x Registration message tunneled in LTE UL Information Transfer message to MME. The 1x Registration message is encapsulated by GCSNA protocol and could include IWS Cell ID information.

Step 503. Upon receiving the encapsulated Registration message, MME passes it to IWS in A21-1x Interface signaling message.

Step 504. IWS responds A21-Ack in Tack-21 seconds to confirm receiving A21-1x air interface signaling message.

Step 505. IWS responds with GCSNAAck capsulated in A21-1x air interface signaling message to MME to indicate the receipt of GCSNA message.

Step 506. MME relays GCSNAAck over eNodeB to the wireless device.

Step 507. Meanwhile, MME confirms with IWS via A21-Ack message that A21-1x air interface signaling message is received.

Step 508. IWS builds up a Location Updating Message using IWS CellID information either received from the wireless device or pre-configured, and then sends it to MSC.

Step 509. MSC responds to IWS with Location Update Accept message.

Step 510. After receiving the confirmation from MSC, IWS builds up a CDMA2000 1x Registration Accepted message and sends to MME via A21-1x air interface signaling message.

Step 511. MME relays the Registration Accepted message in DL Information Transfer message to the wireless device.

Step 512. MME confirms with IWS that the A21-1x air interface signaling message is received in Tack-21 seconds.

Step 513. The wireless device transmits GCSNAAck encapsulated in UL Information Transfer message to MME upon receiving the Registration Accepted message encapsulated by GCSNA.

Step 514. MME relays the GCSNAAck message in A21-1x air interface signaling message to IWS.

Step 515. IWS confirms with MME that the A21-1x air interface signaling message is received within Tack-21 seconds.

In some implementations, it may not be necessary to provide the associated CDMA2000 1x cell information in the Registration message since the Page Response and some other 1x message are transmitted over LTE tunnel for eCSBF. MSC just needs to know the location of the wireless device so as to be able to send the Page Request Message.

Figure 28:
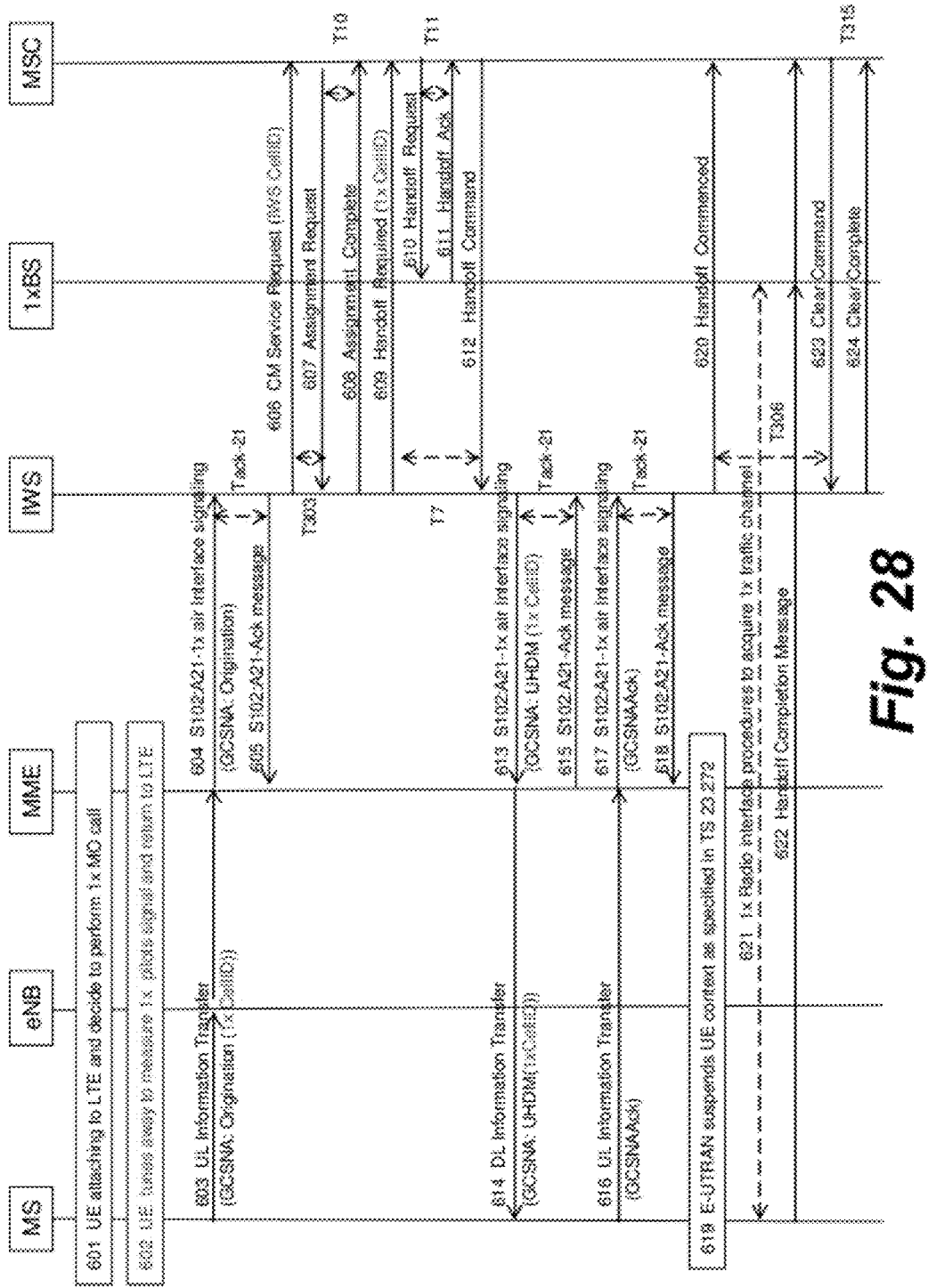
FIG. 28 shows an example of an interworking MO call procedure for eCSFB in the standalone Interworking Service (IWS) case.

FIG. 28 shows an example of interworking MO call procedure for eCSFB in the standalone IWS case.

Step 601. The eCSBF capable wireless device attaches to LTE network and decide to perform a CDMA2000 1x MO call.

Step 602. The wireless device tunes away from the connecting LTE network to CDMA2000 1x network and performs pilot signal measurement of neighboring 1x cells.

Step 603. The wireless device returns to LTE network after the measurement, and transmits the 1x Origination message encapsulated by GCSNA protocol to MME over LTE air interface. The wireless device should provide the CDMA2000 1x cell information including the CellID and radio environment measurement.

Step 604. MME forwards this message to IWS in A21-1x air interface signaling message.

Step 605. IWS responds MME with A21-Ack in Tack-21 seconds to confirm the receipt of A21-1x air interface signaling message.

Step 606. IWS builds a Service Requirement using IWS Cell ID information and sends to MSC.

Step 607. Upon receiving Service Request, MSC sends Assignment Request message to IWS.

Step 608. IWS responds to MSC with Assignment Complete message.

Step 609. Meanwhile, IWS builds up a Handoff Required message using received CDMA2000 1x cell information and send to MSC.

Step 610. MSC sends a Handoff Request Message to 1x BS

Step 611. 1x BS responds with Handoff Ack back to MSC

Step 612. MSC issues the Handoff Command to IWS after receiving Handoff Ack from 1x BS.

Step 613. IWS constructs a Universal Handoff Direction Message (UHDM) with CDMA2000 1x cell information and sends to MME.

Step 614. MME relays this message to the wireless devices.

Step 615. MME sends A21-Ack message to IWS to confirm the receipt of A21-1x air interface signaling message.

Step 616. The wireless device sends GCSNAAck message over LTE tunnel to MME

Step 617. MME passes it to IWS in A21-1x air interface signaling message.

Step 618. IWS sends A21-Ack message to IWS to confirm the receipt of A21-1x air interface signaling message.

Step 619. The wireless device communicates with LTE to suspend the LTE connection and falls back to CDMA2000 1x network.

Step 620. IWS sends Handoff Commenced to MSC to trigger the handoff procedure.

Step 621. The wireless device tunes to CDMA2000 1x radio frequency to acquire 1x signaling.

Step 622. Once the 1x signaling is acquired, the wireless device sends a Handoff Completion message to 1x BS. 1x BS forwards it to MSC.

Step 623. MSC sends Clear Command to IWS

Step 624. IWS clears the resource allocated to the wireless device before and responds with Clear Complete.

Figure 29:
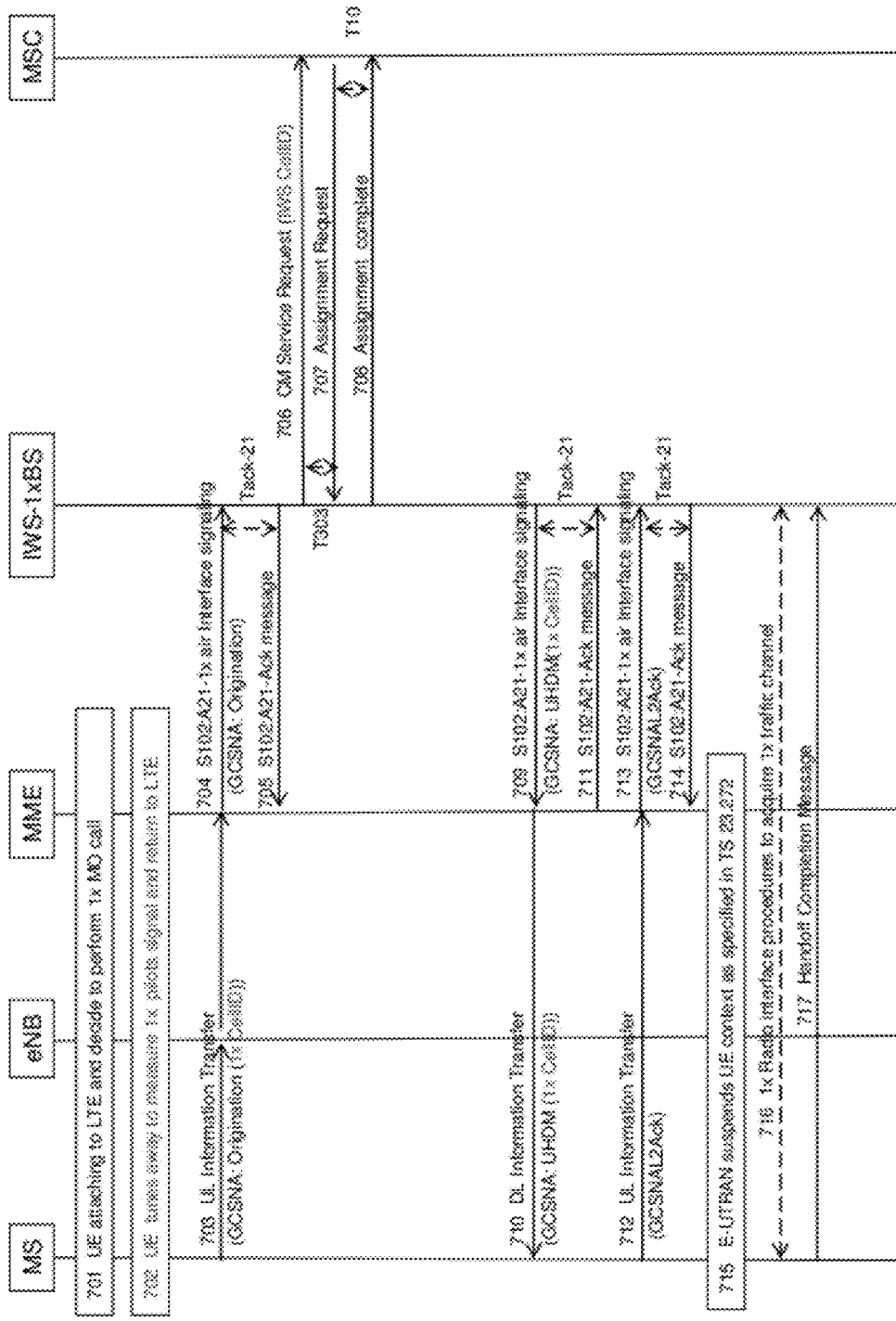
FIG. 29 shows an example of an interworking MO call for eCSFB in integrated IWS-1xBS case.

FIG. 29 shows an example of interworking MO call for eCSFB in integrated IWS-1xBS case.

Step 701. The eCSBF capable wireless device attaches to LTE network and decide to perform a CDMA2000 1x MO call.

Step 702. The wireless device tunes away from the connecting LTE network to CDMA2000 1x network and performs pilot signal measurement of neighboring 1x cells.

Step 703. The wireless device returns to LTE network after the measurement, and transmits the 1x Origination message encapsulated by GCSNA protocol to MME over LTE air interface. The wireless device should provide the CDMA2000 1x cell information including the CellID and radio environment measurement.

Step 704. MME forwards this message to IWS in A21-1x air interface signaling message.

Step 705. IWS-1xBS responds MME with A21-Ack in Tack-21 seconds to confirm the receipt of A21-1x air interface signaling message.

Step 706. IWS-1xBS builds a Service Requirement using IWS Cell ID information and sends to MSC.

Step 707. Upon receiving Service Request, MSC sends Assignment Request message to IWS-1xBS.

Step 708. IWS-1xBS responds to MSC with Assignment Complete message.

Step 709. IWS-1xBS constructs a Universal Handoff Direction Message (UHDM) with received CDMA2000 1x cell information and sends to MME.

Step 710. MME relays this message to the wireless devices.

Step 711. MME sends A21-Ack message to IWS to confirm the receipt of A21-1x air interface signaling message.

Step 712. The wireless device sends GCSNAAck message over LTE tunnel to MME

Step 713. MME passes it to IWS-1xBS in A21-1x air interface signaling message.

Step 714. IWS-1xBS sends A21-Ack message to IWS to confirm the receipt of A21-1x air interface signaling message.

Step 715. The wireless device communicates with LTE to suspend the LTE connection and falls back to CDMA2000 1x network.

Step 716. The wireless device tunes to CDMA2000 1x radio frequency to acquire 1x signaling.

Step 717. Once the 1x signaling is acquired, the wireless device sends a Handoff Completion message to IWS-1xBS.

Figure 30:
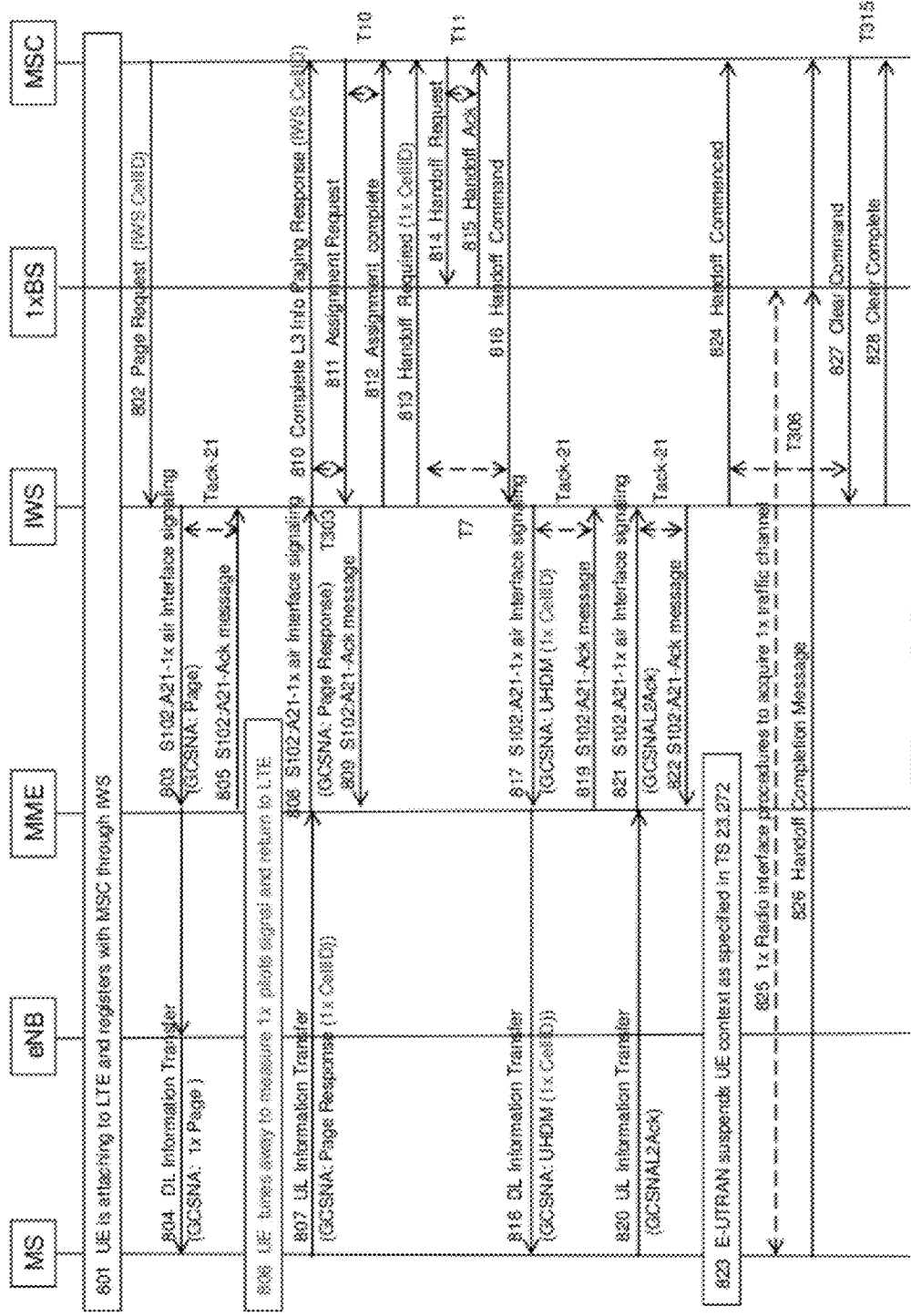
FIG. 30 shows an example of an interworking MT call procedure for eCSFB in standalone IWS case.

FIG. 30 shows an example of interworking MT call procedure for eCSFB in standalone IWS case.

Step 801. The eCSBF capable wireless device attaches to LTE network and registers with CDMA2000 1x MSC through IWS.

Step 802. MSC finds the location of the wireless device through the registration information and sends a Page Request to IWS using IWS Cell ID (or LAC)

Step 803. IWS forwards this message to MME over A21-1x air interface signaling message.

Step 804. MME passes this Page message to the wireless device in DL Information Transfer message.

Step 805. MME responds IWS with A21-Ack message to confirm receipt of A21-1x air interface signaling message.

Step 806. Upon receiving the Page message over LTE tunnel, the wireless device tunes away from the connecting LTE network to CDMA2000 1x network and performs pilot signal measurement of neighboring 1x cells.

Step 807. The wireless device returns to LTE network after the measurement, and transmits the 1x Page Response message encapsulated by GCSNA protocol to MME over LTE air interface. The wireless device should provide the CDMA2000 1x cell information including the CellID and radio environment measurement.

Step 808. MME forwards this message to IWS in A21-1x air interface signaling message.

Step 809. IWS responds MME with A21-Ack in Tack-21 seconds to confirm the receipt of A21-1x air interface signaling message.

Step 810. IWS builds a Page Response using IWS Cell ID information and sends to MSC.

Step 811. Upon receiving Page Response message, MSC sends Assignment Request message to IWS.

Step 812. IWS responds to MSC with Assignment Complete message.

Step 813. Meanwhile, IWS builds up a Handoff Required message using received CDMA2000 1x cell information and send to MSC.

Step 814. MSC sends a Handoff Request Message to 1x BS

Step 815. 1x BS responds with Handoff Ack back to MSC

Step 816. MSC issues the Handoff Command to IWS after receiving Handoff Ack from 1x BS.

Step 817. IWS constructs a Universal Handoff Direction Message (UHDM) with CDMA2000 1x cell information and sends to MME.

Step 818. MME relays this message to the wireless devices.

Step 819. MME sends A21-Ack message to IWS to confirm the receipt of A21-1x air interface signaling message.

Step 820. The wireless device sends GCSNA Ack message over LTE tunnel to MME.

Step 821. MME passes it to IWS in A21-1x air interface signaling message.

Step 822. IWS sends A21-Ack message to IWS to confirm the receipt of A21-1x air interface signaling message.

Step 823. The wireless device communicates with LTE to suspend the LTE connection and falls back to CDMA2000 1x network.

Step 824. IWS sends Handoff Commenced to MSC to trigger the handoff procedure.

Step 825. The wireless device tunes to CDMA2000 1x radio frequency to acquire 1x signaling.

Step 826. Once the 1x signaling is acquired, the wireless device sends a Handoff Completion message to 1x BS. 1x BS forwards it to MSC.

Step 827. MSC sends Clear Command to IWS

Step 828. IWS clears the resource allocated to the wireless device before and responds with Clear Complete.

Figure 31:
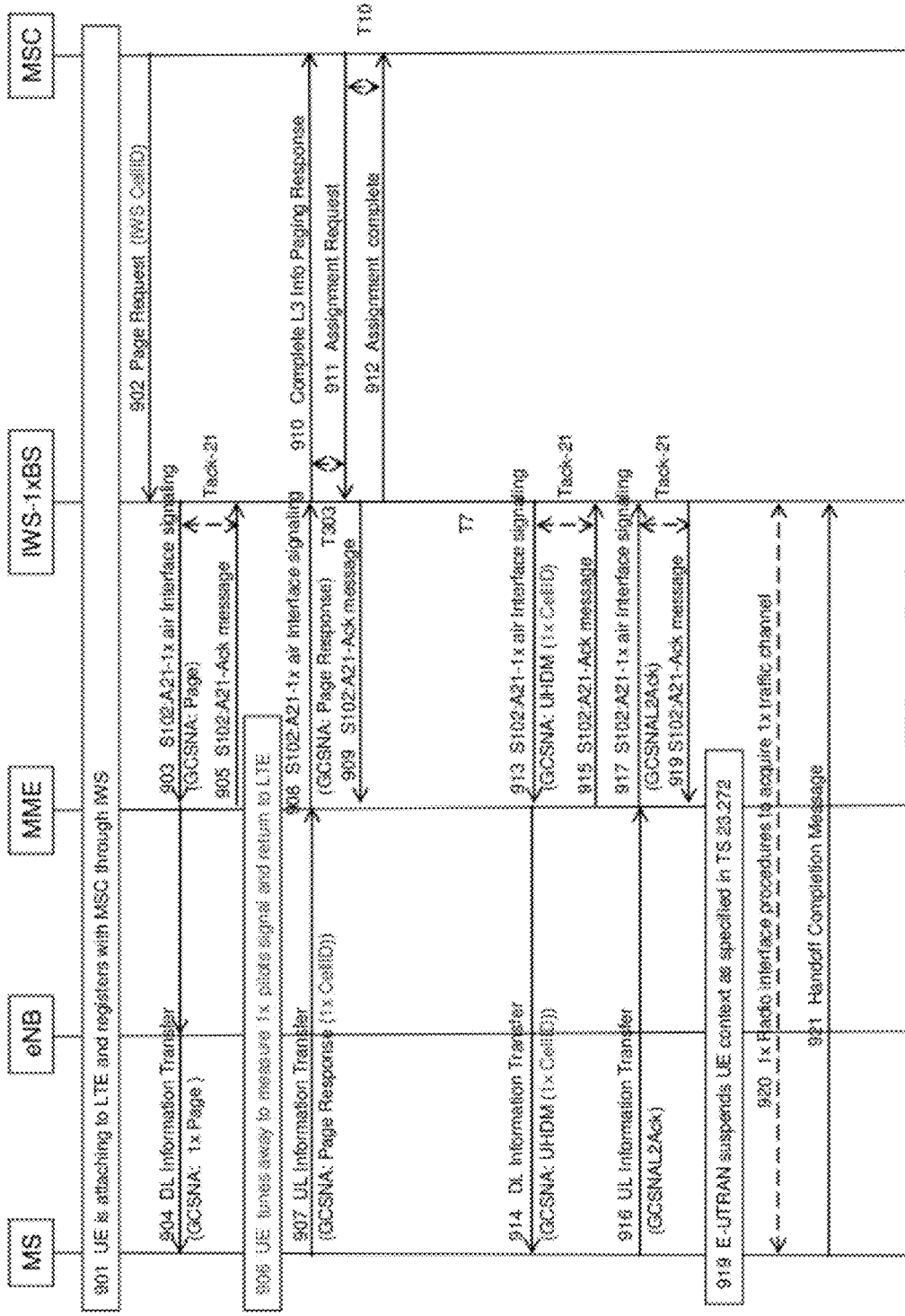
FIG. 31 shows an example of interworking MT call for eCSFB in integrated IWS-1xBS case.

FIG. 31 shows an example of interworking MT call for eCSFB in integrated IWS-1xBS case.

Step 901. The eCSBF capable wireless device attaches to LTE network and registers with CDMA2000 1x MSC through IWS-1xBS.

Step 902. MSC finds the location of the wireless device through the registration information and sends a Page Request to IWS-1xBS using IWS Cell ID (or LAC)

Step 903. IWS-1xBS forwards this message to MME over A21-1x air interface signaling message.

Step 904. MME passes this Page message to the wireless device in DL Information Transfer message.

Step 905. MME responds IWS-1xBS with A21-Ack message to confirm receipt of A21-1x air interface signaling message.

Step 906. Upon receiving the Page message over LTE tunnel, the wireless device tunes away from the connecting LTE network to CDMA2000 1x network and performs pilot signal measurement of neighboring 1x cells.

Step 907. The wireless device returns to LTE network after the measurement, and transmits the 1x Page Response message encapsulated by GCSNA protocol to MME over LTE air interface. The wireless device should provide the CDMA2000 1x cell information including the CellID and radio environment measurement.

Step 908. MME forwards this message to IWS-1xBS in A21-1x air interface signaling message.

Step 909. IWS-1xBS responds MME with A21-Ack in Tack-21 seconds to confirm the receipt of A21-1x air interface signaling message.

Step 910. IWS-1xBS builds a Page Response using IWS Cell ID information and sends to MSC.

Step 911. Upon receiving Page Response message, MSC sends Assignment Request message to IWS-1xBS.

Step 912. IWS-1xBS responds to MSC with Assignment Complete message.

Step 913. IWS-1xBS constructs a Universal Handoff Direction Message (UHDM) with received CDMA2000 1x cell information and sends to MME.

Step 914. MME relays this message to the wireless devices.

Step 915. MME sends A21-Ack message to IWS-1xBS to confirm the receipt of A21-1x air interface signaling message.

Step 916. The wireless device sends GCSNA Ack message over LTE tunnel to MME

Step 917. MME passes it to IWS-1xBS in A21-1x air interface signaling message.

Step 918. IWS-1xBS sends A21-Ack message to IWS to confirm the receipt of A21-1x air interface signaling message.

Step 919. The wireless device communicates with LTE to suspend the LTE connection and falls back to CDMA2000 1x network.

Step 920. The wireless device tunes to CDMA2000 1x radio frequency to acquire 1x signaling.

Step 921. Once the 1x signaling is acquired, the wireless device sends a Handoff Completion message to IWS-1xBS.

A radio station such as a base station or a wireless device can include processor electronics such as a microprocessor that implements methods such as one or more of the techniques presented in this document. A radio station can include transceiver electronics to send and/or receive wireless signals over one or more communication interfaces such as an antenna. A radio station can include other communication interfaces for transmitting and receiving data. A radio station can include one or more memories configured to store information such as data and/or instructions.

The disclosed and other embodiments and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described implementations, and other implementations can be made based on what is disclosed.

What is claimed is:

1. A system for wireless communications, comprising:
one or more first base stations forming a first radio access network to provide wireless communications based on a first wireless technology;
one or more second base stations forming a second radio access network to provide wireless communications based on a second wireless technology which is different from the first wireless technology, and
an interworking service (IWS) module that is configured to provide the interworking between the first and second radio access networks for communications to a wireless device served by the system via either the first wireless technology or the second wireless technology, and uses a signal adaptation protocol to encapsulate messages in communicating with a wireless device served by the system,
wherein the IWS module is configured to transmit a first location update message carrying a first cell ID information for the wireless device served by the system and a second location update message carrying a second cell ID information for itself.

2. The system as in claim 1, wherein:
the IWS module provides a tunnel for transmitting a message via the second radio access network to the wireless device for a voice service provided by the first wireless technology in a mobile terminated (MT) voice call or a mobile originated (MO) call.

3. The system as in claim 1, wherein:
the first wireless technology is a Code Division Multiple Access 2000 1x (CDMA2000 1x) technology and the second wireless technology is a Long-Term Evolution (LTE) technology.

4. The system as in claim 1, wherein:
the first wireless technology is a Code Division Multiple Access 2000 1x(CDMA2000 1x) technology and the second wireless technology is a CDMA2000 High Rate Packet Data (HRPD) technology.

5. The system as in claim 1, wherein:
the signal adaptation protocol is configured to include a set of pre-defined messages for communications under the first wireless technology, and
the IWS module is configured to use the set of pre-defined messages to filter a message to be transmitted via the signal adaptation protocol; and to reject the received message that is not in the set of pre-defined messages via responding to a rejection message of the signal adaptation protocol.

6. The system as in claim 1, wherein:
the signal adaptation protocol is configured to include a transfer message to encapsulate a message for communications under the first wireless technology over a channel under the second wireless technology, and a respective acknowledgment message to respond to a received transfer message.

7. The system as in claim 6, wherein:
the IWS module is configured to use the transfer message and the respective acknowledgment message to detect duplicated messages and to perform retransmission of a message.

8. The system as in claim 1, comprising:
one or more third base stations forming a third radio access network to provide wireless communications based on a third wireless technology which is different from the first and second wireless technologies,
wherein the IWS module is configured to provide the interworking between the first, second and third radio access networks for communications to the wireless device served by the system via either one of the first, second and third wireless technologies.

9. A wireless communication device for wirelessly communicating based on a first wireless technology and a second wireless technology different from the first wireless technology, comprising:
a first communication mechanism that communicates with one or more first base stations forming a first radio access network of a wireless communication system to provide wireless communications based on the first wireless technology;
a second communication mechanism that communicates with one or more second base stations forming a second radio access network of the wireless communication system to provide wireless communications based on the second wireless technology;
a message generation mechanism that operates based on a signal adaptation protocol to encapsulate messages in communicating via the first wireless technology or the second wireless technology and supports switching wireless communications between the first wireless technology and the second wireless technology; and
another mechanism that, upon receiving a paging message for the first wireless network, over the second wireless network, tunes to the first wireless network to measure pilot signal strength of neighboring cells from the first wireless network and provides a response that includes radio measurements and cell identification information for the first wireless network over the second wireless network.

10. The wireless communication device as in claim 9, wherein:
the wireless communication device is part of a mobile device, a cell phone, or a wireless air card.

11. The wireless communication device as in claim 9, wherein:
the message generation mechanism provides a tunnel over the second wireless technology network for transmitting a message of the first wireless technology for a mobile terminated (MT) voice call or a mobile originated (MO) call to an interworking service (IWS) module that is in the wireless communication system and is configured to provide the interworking between the first and second radio access networks for communications with the wireless communication device.

12. The wireless communication device as in claim 11, wherein:
the first wireless technology is a Code Division Multiple Access 2000 1x(CDMA2000 1x) technology and the second technology is a Long-Term Evolution (LTE) technology.

13. The wireless communication device as in claim 12, wherein:
the message generation mechanism encapsulates and tunnels based on the LTE technology a registration message, a Short Message Service (SMS) message, and Paging Response of CDMA2000 1x at the IWS.

14. The wireless communication device as in claim 11, wherein:
the first wireless technology is a Code Division Multiple Access 2000 1x(CDMA2000 1x) technology and the second technology is a CDMA2000 High Rate Packet Data (HRPD) technology.

15. The wireless communication device as in claim 11, wherein:
the first wireless technology is a Code Division Multiple Access 2000 1x(CDMA2000 1x) technology and the second technology is a CDMA2000 High Rate Packet Data (HRPD) technology.

16. The wireless communication device as in claim 9, wherein:
the signal adaptation protocol includes a message field that supports duplicated message detection.

17. The wireless communication device as in claim 9, wherein:
the signal adaptation protocol includes a message field that supports acknowledgement (ACK) based retransmission of a message.

* * * * *